United States Patent
Jiang et al.

(10) Patent No.: US 11,206,668 B2
(45) Date of Patent: Dec. 21, 2021

(54) METHOD AND DEVICE IN UE AND BASE STATION FOR WIRELESS COMMUNICATION

(71) Applicants: Qi Jiang, Shanghai (CN); Xiaobo Zhang, Shanghai (CN)

(72) Inventors: Qi Jiang, Shanghai (CN); Xiaobo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 0 days.

(21) Appl. No.: 16/872,403

(22) Filed: May 12, 2020

(65) Prior Publication Data

US 2020/0275448 A1    Aug. 27, 2020

Related U.S. Application Data

(63) Continuation of application No. PCT/CN2017/113310, filed on Nov. 28, 2017.

(51) Int. Cl.
*H04W 72/04* (2009.01)
*H04L 1/00* (2006.01)
(Continued)

(52) U.S. Cl.
CPC ....... *H04W 72/0473* (2013.01); *H04L 1/0004* (2013.01); *H04L 5/0051* (2013.01);
(Continued)

(58) Field of Classification Search
CPC .... H04B 7/0608; H04L 1/0003; H04W 74/08; H04W 74/0808; H04W 74/0816
See application file for complete search history.

(56) References Cited

U.S. PATENT DOCUMENTS

2016/0007368 A1    1/2016   Moon et al.
2016/0192396 A1    6/2016   Ng
(Continued)

FOREIGN PATENT DOCUMENTS

CN        106162695 A      11/2016

OTHER PUBLICATIONS

CN201810004459.7 1st Office Action dated May 12, 2021.
CN201810004459.7 First Search Report dated May 2, 2021.

*Primary Examiner* — Pao Sinkantarakorn

(57) ABSTRACT

The present disclosure provides a method and a device in a User Equipment (UE) and a base station used for wireless communication. The UE performs energy detection in a first time interval to obtain a first detection power, and performs energy detection in a second time interval to obtain a second detection power; a value of the first count is obtained according to the relationship between the first detection power and a first threshold, and a value of the second count is obtained according to the relationship between the second detection power and a second threshold. The present disclosure optimizes the selection of beamforming-based transmission parameter group by establishing a relationship between a spatial transmit parameter group adopted by the first radio signal, a length of a time window for energy detection and multiple thresholds, thereby improving overall system performance.

20 Claims, 17 Drawing Sheets

(51) Int. Cl.
  *H04L 5/00*   (2006.01)
  *H04W 16/14*  (2009.01)
  *H04W 24/08*  (2009.01)
  *H04W 24/10*  (2009.01)

(52) U.S. Cl.
  CPC ........... *H04L 5/0082* (2013.01); *H04W 16/14* (2013.01); *H04W 24/08* (2013.01); *H04W 24/10* (2013.01)

(56) References Cited

U.S. PATENT DOCUMENTS

| | | | |
|---|---|---|---|
| 2017/0012748 A1* | 1/2017 | Dabeer | H04W 74/0816 |
| 2018/0027554 A1* | 1/2018 | Yerramalli | H04L 1/0009 370/329 |
| 2019/0173607 A1* | 6/2019 | Liu | H04L 1/0003 |
| 2020/0059962 A1* | 2/2020 | Tejedor | H04W 16/14 |
| 2020/0314906 A1* | 10/2020 | Goyal | H04B 7/0695 |

* cited by examiner

METHOD AND DEVICE IN UE AND BASE STATION FOR WIRELESS COMMUNICATION

CROSS REFERENCE TO RELATED APPLICATIONS

This application is a continuation of International Application No. PCT/CN2017/113310, filed on Nov. 28, 2017, claiming the priority benefit of International Application PCT/CN2017/113310, filed on Nov. 28, 2017, the full disclosure of which is incorporated herein by reference.

BACKGROUND

Technical Field

The present disclosure relates to transmission methods and devices in wireless communication systems, and in particular to a communication method and device that support data transmission on Unlicensed Spectrum.

Related Art

In the traditional 3rd Generation Partner Project (3GPP) Long-term Evolution (LTE) system, data transmission can only occur on the licensed spectrum. However, with the rapid increase of traffic, especially in some urban areas, the licensed spectrum may not meet the demand of traffic. The communication on the unlicensed spectrum in Release 13 and Release 14 is introduced by the cellular system and is used for the transmission of downlink and uplink data. To ensure compatibility with other access technologies on unlicensed spectrum, Listen Before Talk (LBT) technology is adopted by Licensed Assisted Access (LAA) to avoid interference caused by multiple transmitters occupying the same frequency resources at the same time.

At present, the technical discussion of 5G New Radio Access Technology (NR) is in progress, among which massive Multi-Input Multi-Output (MIMO) becomes a research hotspot of the next generation mobile communication. In massive MIMO, multiple antennas form beams pointing to a specific spatial direction through beamforming to improve the communication quality. When considering the coverage characteristics brought by beamforming, the traditional LBT scheme in LAA needs to be reconsidered.

SUMMARY

In the traditional LBT system, considering the compatibility with other non-3GPP access technologies on the unlicensed spectrum, the transmitting device will judge whether the frequency-domain resources corresponding to the unlicensed spectrum are idle according to a fixed threshold. At the same time, when the number of the idle resources detected on the licensed spectrum in a given time window meets a certain criterion, the transmitting device can occupy the unlicensed spectrum for data transmission.

After introducing massive MIMO technology, when the transmitting device is configured to support multiple beamforming vectors; the widths of the multiple beamforming vectors are different, or the coverages of the multiple beamforming vectors are different, so it is unreasonable to judge whether frequency-domain resources corresponding to different beams are idle according to the same fixed threshold.

In view of the above problem, the present disclosure provides a solution. It should be noted that the embodiments of a User Equipment (UE) in the present disclosure and the characteristics in the embodiments may be applied to a base station if no conflict is incurred, and vice versa. The embodiments of the present disclosure and the characteristics in the embodiments may be mutually combined if no conflict is incurred.

The present disclosure provides a method in a UE for wireless communication, comprising:
a first detection power is obtained by performing energy detection in a first time interval, and a second detection power is obtained by performing energy detection in a second time interval;
when the first detection power is lower than a first threshold, a first update is performed on a first count; when the second detection power is lower than a second threshold, a second update is performed on a second count;
a value of the first count is equal to Q1, and a first radio signal is transmitted on a first sub-band in a third time window using a first spatial transmit (Tx) parameter group; or, a value of the second count is equal to Q2, and the first radio signal is transmitted on the first sub-band in a fourth time window using the second spatial transmit (Tx) parameter group;
wherein, the Q1 and Q2 are positive integers respectively.

In one embodiment, the above method is characterized in that the first detection power corresponds to a first beamforming vector, and the second detection power is for a second beamforming vector; the UE detects whether a channel is idle on two different beams according to different criteria (i.e., a first threshold and Q1 correspond to a first beamforming vector, and a second threshold and Q2 correspond to a second beamforming vector), and then takes the transmission gain brought by beamforming into the account of the interference to other transmission equipment, so as to avoid the interference from the same frequency and improve the system's overall performance.

In one embodiment, the above method is also characterized in that when the first detection is for a narrower beam, the second detection is for a wider beam; because the narrower one has better directivity, it is necessary to define a smaller threshold (first threshold), while the wider one has poor directivity, it is necessary to define a larger threshold (second threshold); so as to ensure that when the UE selects a narrow one for transmission, it needs to meet a stricter threshold to reduce the interference to the neighborhood.

In one embodiment, another characteristic of the above method is that when the first detection is for a lower threshold (first threshold), and the second detection is for a higher threshold (second threshold), a value of Q1 is set to be small and a value of Q2 is set to be big to ensure that the UE can adopt a narrower beam transmission for the first threshold more quickly when the first threshold is met, thereby improving the performance of the system.

In one embodiment, the above method is advantageous in that the LBT process for the first beamforming vector and the LBT process for the second beamforming vector are designed independently to improve the LBT efficiency, and decision threshold and contention window are set independently according to the coverages and widths of different beamforming vectors, so as to improve the connection efficiency and reduce the co-frequency interference, thus improving the overall performance of the system.

According to one aspect of the present disclosure, the above method is characterized in comprising:
receiving first signaling;
wherein the first signaling indicates a first antenna port group and a second antenna port group, the first antenna port group and the second antenna port group respectively include a positive integer number of antenna port(s), the first antenna port group and the second antenna port group are respectively associated with the first spatial transmit (Tx) parameter group and the second spatial transmit (Tx) parameter group.

In one embodiment, the above method is advantageous in that the serving base station of the UE is simultaneously configured with the first antenna port group and the second antenna port group to provide conditions for the UE to adopt different beamforming vectors for transmission according to the channel conditions, and then realize the gain brought by beamforming in the transmission.

According to one aspect of the present disclosure, the above method is characterized in comprising:

receiving a first downlink reference signal and a second downlink reference signal respectively;

wherein a measurement for the first downlink reference signal and a measurement for the second downlink reference signal are used to generate the first spatial transmit (Tx) parameter group and the second spatial transmit (Tx) parameter group respectively.

In one embodiment, the above method is advantageous in that the UE selects a suitable beamforming vector through the first downlink reference signal and the second downlink reference signal to realize the gain brought by the beamforming.

According to one aspect of the present disclosure, the above method is characterized in comprising:

receiving second signaling;

wherein the second signaling is used to determine a first modulation and coding scheme and a second modulation and coding scheme, which respectively correspond to the first spatial transmit (Tx) parameter group and the second spatial transmit (Tx) parameter group.

In one embodiment, the above method is advantageous in that when the UE uses different beamforming vectors for transmission, different modulation and coding schemes are used to further improve the spectral efficiency of the first radio signal.

According to one aspect of the present disclosure, the above method is characterized in that the first threshold and the second threshold are the same; a measurement for the first antenna port group is used for the energy detection performed within the first time interval, and a measurement for the second antenna port group is used for the energy detection performed within the second time interval.

In one embodiment, the above method is advantageous in that the same threshold is set, and the possibility of transmitting on different beams is adjusted only by different Q1 and Q2 values, thus simplifying the LBT process.

According to one aspect of the present disclosure, the above method is characterized in that antenna gains respectively corresponding to the first spatial transmit (Tx) parameter group and the second spatial transmit (Tx) parameter group are different.

In one embodiment, the above method is characterized in that the first spatial transmit (Tx) parameter group and the second spatial transmit (Tx) parameter group respectively correspond to different beamforming vectors.

The present disclosure provides a method in a base station for wireless communication, comprising:

monitoring a first radio signal in a third time window on a first sub-band and monitoring a first radio signal in a fourth time window on a first sub-band;

wherein the transmitter of the first radio signal is a first terminal; the first terminal performs energy detection in a first time interval to obtain a first detection power, and the first terminal performs energy detection in a second time interval to obtain a second detection power; when the first detection power is lower than a first threshold, the first terminal performs a first update on a first count; when the second detection power is lower than a second threshold, the first terminal performs a second update on a second count; the first count value is equal to Q1, and the first terminal transmits a first radio signal on a first sub-band in a third time window by using a first spatial transmit (Tx) parameter group; or, a value of the second count is equal to Q2, and the first terminal transmits the first radio signal on the first sub-band in a fourth time window using the second spatial transmit (Tx) parameter group; the Q1 and Q2 are positive integers respectively.

According to one aspect of the present disclosure, the above method is characterized in comprising:

transmitting first signaling;

wherein the first signaling indicates a first antenna port group and a second antenna port group, the first antenna port group and the second antenna port group respectively include a positive integer number of antenna port(s), the first antenna port group and the second antenna port group are respectively associated with the first spatial transmit (Tx) parameter group and the second spatial transmit (Tx) parameter group.

According to one aspect of the present disclosure, the above method is characterized in comprising:

transmitting a first downlink reference signal and a second downlink reference signal respectively;

wherein a measurement for the first downlink reference signal and a measurement for the second downlink reference signal are used to generate the first spatial transmit (Tx) parameter group and the second spatial transmit (Tx) parameter group respectively.

According to one aspect of the present disclosure, the above method is characterized in comprising:

transmitting second signaling;

wherein the second signaling is used to determine a first modulation coding scheme and a second modulation coding scheme, which respectively correspond to the first spatial transmit (Tx) parameter group and the second spatial transmit (Tx) parameter group.

According to one aspect of the present disclosure, the above method is characterized in that the first threshold and the second threshold are the same; a measurement for the first antenna port group is used for the energy detection performed within the first time interval, and a measurement for the second antenna port group is used for the energy detection performed within the second time interval.

According to one aspect of the present disclosure, the above method is characterized in that the antenna gains corresponding to the first spatial transmit (Tx) parameter group and the second spatial transmit (Tx) parameter group are different.

The present disclosure provides a UE for wireless communication, comprising:

a first receiver, performing energy detection in a first time interval to obtain a first detection power, and energy detection in a second time interval to obtain a second detection power;

a first processor, performing a first update on a first count when the first detection power is lower than a first threshold, and a second update on a second count when the second detection power is lower than a second threshold; and a first transmitter, transmitting a first radio signal on the first sub-band in a third time window using the first spatial transmit (Tx) parameter group when a value of the first count is equal to Q1; or, transmitting the first radio signal on the first sub-band in a fourth time window using the second spatial transmit (Tx) parameter group when a value of the second count is equal to Q2;

wherein, the Q1 and Q2 are positive integers respectively.

In one embodiment, the above UE for wireless communication is characterized in that the first receiver further receives first signaling; wherein the first signaling indicates a first antenna port group and a second antenna port group, the first antenna port group and the second antenna port group respectively include a positive integer number of antenna port(s), the first antenna port group and the second antenna port group are respectively associated with the first spatial transmit (Tx) parameter group and the second spatial transmit (Tx) parameter group.

In one embodiment, the above UE for wireless communication is characterized in that the first receiver also receives a first downlink reference signal and a second downlink reference signal respectively; wherein a measurement for the first downlink reference signal and a measurement for the second downlink reference signal are used to generate the first spatial transmit (Tx) parameter group and the second spatial transmit (Tx) parameter group respectively.

In one embodiment, the above UE for wireless communication is characterized in that the first receiver further receives a second signaling; wherein the second signaling is used to determine a first modulation coding scheme and a second modulation coding scheme, which respectively correspond to the first spatial transmit (Tx) parameter group and the second spatial transmit (Tx) parameter group.

In one embodiment, the above UE for wireless communication is characterized in that the first threshold and the second threshold are the same; a measurement for the first antenna port group is used for the energy detection performed within the first time interval, and a measurement for the second antenna port group is used for the energy detection performed within the second time interval.

In one embodiment, the above UE for wireless communication is characterized in that the antenna gains corresponding to the first spatial transmit (Tx) parameter group and the second spatial transmit (Tx) parameter group are different.

The present disclosure provides a base station for wireless communication, comprising:

a second receiver, monitoring a first radio signal in a third time window on a first sub-band and monitoring a first radio signal in a fourth time window on a first sub-band;

wherein the transmitter of the first radio signal is a first terminal; the first terminal performs energy detection in a first time interval to obtain a first detection power, and the first terminal performs energy detection in a second time interval to obtain a second detection power; when the first detection power is lower than a first threshold, the first terminal performs a first update on a first count; when the second detection power is lower than a second threshold, the first terminal performs a second update on a second count; the first count value is equal to Q1, and the first terminal transmits a first radio signal on a first sub-band in a third time window by using a first spatial transmit (Tx) parameter group; or, a value of the second count is equal to Q2, and the first terminal transmits the first radio signal on the first sub-band in a fourth time window using the second spatial transmit (Tx) parameter group; the Q1 and Q2 are positive integers respectively.

In one embodiment, the above base station for wireless communication is characterized in that the base station device also includes a second transmitter, which transmits a first signaling; wherein the first signaling indicates a first antenna port group and a second antenna port group, the first antenna port group and the second antenna port group respectively include a positive integer number of antenna port(s), the first antenna port group and the second antenna port group are respectively associated with the first spatial transmit (Tx) parameter group and the second spatial transmit (Tx) parameter group.

In one embodiment, the above base station for wireless communication is characterized in that the base station device also includes a second transmitter, which transmits a first downlink reference signal and a second downlink reference signal respectively; wherein a measurement for the first downlink reference signal and a measurement for the second downlink reference signal are used to generate the first spatial transmit (Tx) parameter group and the second spatial transmit (Tx) parameter group respectively.

In one embodiment, the above base station for wireless communication is characterized in that the base station device also includes a second transmitter, which transmits a second signaling; wherein the second signaling is used to determine a first modulation coding scheme and a second modulation coding scheme, which respectively correspond to the first spatial transmit (Tx) parameter group and the second spatial transmit (Tx) parameter group.

In one embodiment, the above base station for wireless communication is characterized in that the first threshold and the second threshold are the same; a measurement for the first antenna port group is used for the energy detection performed within the first time interval, and a measurement for the second antenna port group is used for the energy detection performed within the second time interval.

In one embodiment, the above base station for wireless communication is characterized in that the antenna gains corresponding to the first spatial transmit (Tx) parameter group and the second spatial transmit (Tx) parameter group are different.

In one embodiment, the present disclosure has the following advantages over conventional schemes:

the LBT process for a first beamforming vector and the LBT process for a second beamforming vector are designed independently to improve the efficiency of LBT, and the decision threshold and competition window are set independently according to the coverage and width of different beamforming vectors to improve the access efficiency and reduce the co-channel interference, so as to improve the overall performance of the system.

the serving base station of the UE simultaneously configures the first antenna port group and the second antenna port group to respectively target at a first beamforming vector and a second beamforming vector, enabling the UE to employ different beamforming vectors for transmission in accordance with channel conditions, so as to realize the gain brought by beamforming in transmission.

the UE selects a suitable beamforming vector through the first downlink reference signal and the second downlink reference signal to realize the gain brought by the beamforming.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
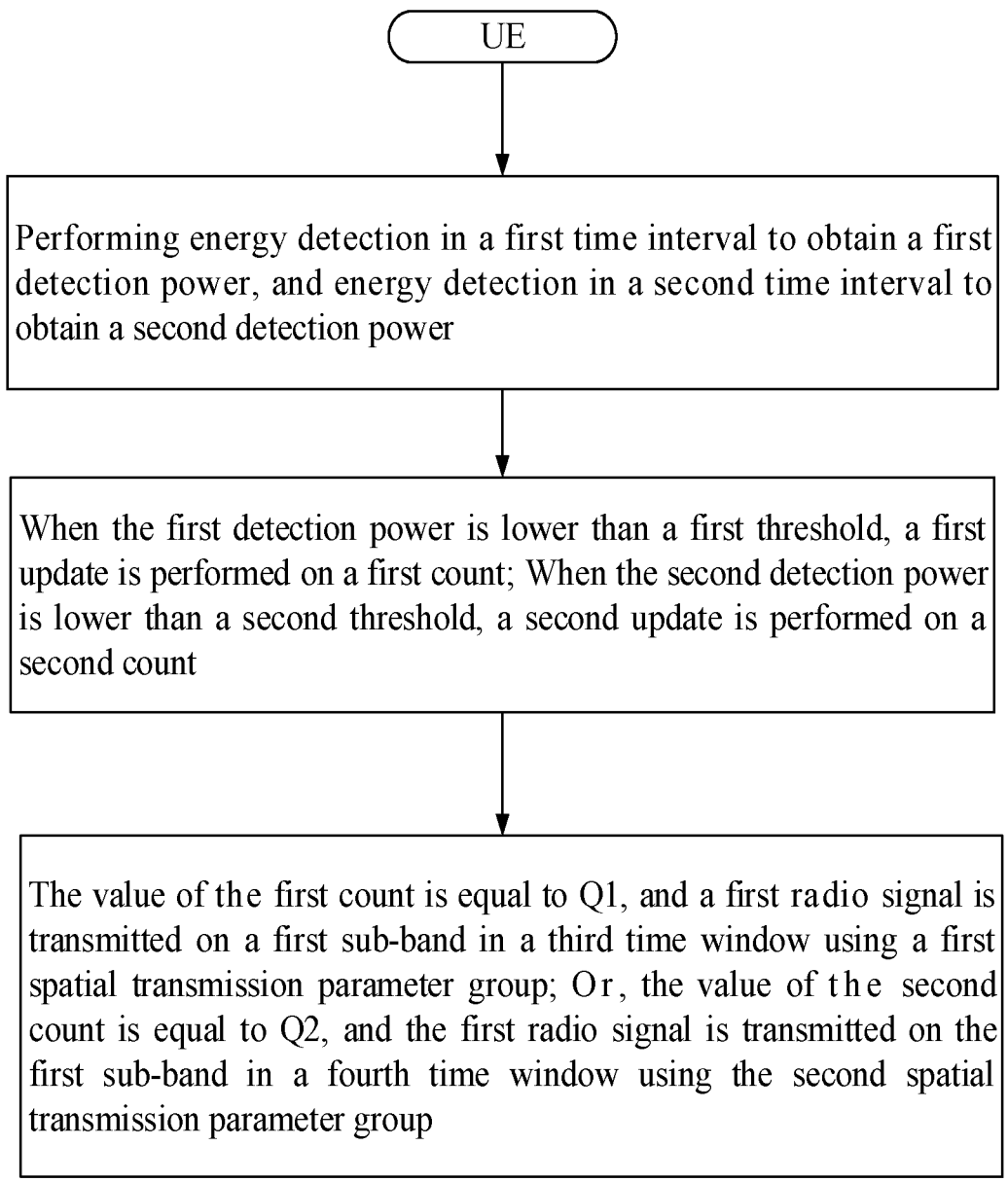
FIG. 1 illustrates a flowchart of a first radio signal according to one embodiment of the present disclosure.

Embodiment 1 illustrates a flowchart of a first radio signal, as shown in FIG. 1.

In Embodiment 1, the UE in the present disclosure performs energy detection in a first time interval to obtain a first detection power, and energy detection in a second time interval to obtain a second detection power; when the first detection power is lower than a first threshold, a first update is performed on a first count; when the second detection power is lower than a second threshold, a second update is performed on a second count; when a value of the first count is equal to Q1, a first radio signal is transmitted on a first sub-band in a third time window using a first spatial transmit (Tx) parameter group; or, when a value of the second count is equal to Q2, the first radio signal is transmitted on the first sub-band in a fourth time window using the second spatial transmit (Tx) parameter group; the Q1 and Q2 are positive integers respectively.

In one subembodiment, the UE includes a first counter, which is used for the first count.

In one subsidiary embodiment of the subembodiment, a first update on the first count means that the first counter adds 1, or the first counter is reset to 0.

In one example of the subsidiary embodiment, a value of the first count is equal to Q1 corresponding to the first counter is equal to Q1.

In one subsidiary embodiment of the subembodiment, the first update of the first count means that the first counter minus 1, or that the first counter is reset to (Q1-1).

In one example of the subsidiary embodiment, a value of the first count is equal to Q1 corresponding to the first counter is equal to 0.

In one subembodiment, the UE includes a second counter, which is used for the second count.

In one subsidiary embodiment of the subembodiment, the second update on the second count means that the second counter adds 1, or the second counter is reset to 0.

In one example of the subsidiary embodiment, a value of the second count is equal to Q2 corresponding to the second counter is equal to Q2.

In one subsidiary embodiment of the subembodiment, the second update of the second count means that the second counter minus 1, or the second counter is reset to (Q2-1).

In one example of the subsidiary embodiment, a value of the second count is equal to Q2 corresponding to the second counter is equal to 0.

In one subembodiment, when the first detection power is not lower than the second threshold, the first sub-band is considered busy.

In one subembodiment, when the second detection power is not lower than the second threshold, the first sub-band is considered busy.

In one subembodiment, when a value of the first count is equal to Q1, the UE transmits the first radio signal on the first sub-band in the third time window using the first spatial transmit (Tx) parameter group.

In one subsidiary embodiment of the subembodiment, a first time window comprises K1 first-type time interval(s), and the UE performs energy detection respectively within the K1 first-type time interval(s) to obtain K1 first-type detection power(s); the first time interval is any one of the K1 first-type time interval(s), and the first detection power is the first-type detection power corresponding to the first time interval in the K1 first-type detection power(s); a value of the first count is equal to Q1 refers to: among the K1 first-type detection power(s), each of Q1 first-type detection power is smaller than the first threshold; the K1 is a positive integer not less than Q1.

In one subembodiment, when a value of the second count is equal to Q2, the UE transmits the first radio signal on the first sub-band in the fourth time window using the second spatial transmit (Tx) parameter group.

In one subsidiary embodiment of the subembodiment, the second time window comprises K2 second-type time interval(s), and the UE performs energy detection respectively within the K2 second-type time interval(s) to obtain K2 second-type detection power(s); the second time interval is any one of the K2 second-type time interval(s), and the second detection power is the second-type detection power corresponding to the second time interval in the K2 second-type detection power(s); among the K2 second-type detection power(s), Q2 second-type detection power(s) is(are) all smaller than the second threshold. The K2 is a positive integer not less than the Q2.

In one subembodiment, a value of the first count in a first time window is less than Q1, and the UE continues to perform energy detection within the time interval after the first time window.

In one subsidiary embodiment of the subembodiment, a first counter is used for the first count, and is not reset when the UE continues to perform energy detection within the time interval after the first time window.

In one subembodiment, a value of the second count in a second time window is less than Q2, and the UE continues to perform energy detection within the time interval after the second time window.

In one subsidiary embodiment of the subembodiment, the second counter is used for the second count, which is not reset when the UE continues to perform energy detection within the time interval after the second time window.

In one subembodiment, a value of the first count in a first time window is less than Q1, and a value of the second count in a second time window is less than Q2, and the first time window is located before the second time window in time domain; the UE continues to perform energy detection within a time interval after the second time window.

In one subsidiary embodiment of the subembodiment, a first counter is used for the first count. When the UE continues to perform energy detection within the time interval after the second time window, the first counter is reset to 0, or the first counter is reset to (Q1-1).

In one subsidiary embodiment of the subembodiment, a second counter is used for the second count, which is not reset when the UE continues to perform energy detection within the time interval after the second time window.

In one subembodiment, the first radio signal is transmitted on the first sub-band in the third time window using the first spatial transmit (Tx) parameter group, the first counter is used for the first count, the first counter is reset to 0, or the first counter is reset to (Q1-1).

In one subembodiment, the first radio signal is transmitted on the first sub-band in the fourth time window using the second spatial transmit (Tx) parameter group, the second counter is used for the second count, the second counter is reset to 0, or the second counter is reset to (Q2-1).

In one subembodiment, the first time window in the disclosure is used for the first count, and the second time window is used for the second count.

In one subsidiary embodiment of the subembodiment, the duration of the first time window is determined by Radio Resource Control (RRC) signaling.

In one subsidiary embodiment of the subembodiment, the duration of the second time window is determined by RRC signaling.

In one subsidiary embodiment of the subembodiment, the duration of the first time window is related to the Q1.

In one subsidiary embodiment of the subembodiment, the duration of the second time window is related to the Q2.

In one sub embodiment, the Q1 is equal to 1.

In one sub embodiment, the Q2 is equal to 1.

In one sub embodiment, the Q1 is a positive integer, the Q2 is a positive integer, and the Q1 is not equal to the Q2.

In one subsidiary embodiment of the subembodiment, the Q1 is smaller than the Q2.

In one subembodiment, the Q1 and Q2 are determined by an RRC signaling.

In one subembodiment, the energy detection refers to the power monitored by the UE in the given time unit, the given time unit belongs to the first time interval, or the given time window belongs to the second time interval.

In one subembodiment, the energy detection refers to: the UE senses all radio signals on a given frequency domain resource in a given time unit to obtain a given power; the given time unit belongs to the first time interval and the given power is a first detection power, or the given time unit belongs to a second time interval and the given power is a second detection power.

In one subsidiary embodiment of the subembodiment, the given power is the energy obtained by multiple times of sensing in the given time unit.

In one subsidiary embodiment of the subembodiment, the given power is a quotient of the energy obtained by multiple times of sensing in the given time unit and the given time unit.

In one subsidiary embodiment of the sub embodiment, the duration of the given time unit is fixed.

In one subsidiary embodiment of the subembodiment, the given time unit is continuous in the time domain.

In one subsidiary embodiment of the subembodiment, the duration of the given time window is 4 µs.

In one subembodiment, the energy detection belongs to the Clear Channel Assessment (CCA) process.

In one subembodiment, the energy detection is used to determine whether the first sub-band is idle.

In one subembodiment, the first detection power is independent of the energy detection beyond the first time interval.

In one subembodiment, the second detection power is independent of the energy detection beyond the second time interval.

In one subembodiment, the first sub-band is deployed on the unlicensed spectrum.

In one subembodiment, the units of the first detection power, the second detection power, the first threshold and the second threshold are decibel (dBm).

In one subembodiment, the units of the first detection power, the second detection power, the first threshold and the second threshold are milliwatt (mW).

In one subembodiment, the first threshold is the same as the second threshold.

In one subembodiment, a value of the first threshold and the second threshold are the same.

In one subembodiment, the first threshold is smaller than the second threshold.

In one subembodiment, when the first radio signal is transmitted, the transmission power of the first radio signal is independent of the first detection power; or the transmission power of the first radio signal is independent of the second detection power.

In one subembodiment, both the energy detection performed in the first time interval and the energy detection performed in the second time interval are performed on the first sub-band.

In one subembodiment, the first time interval and the second time interval are orthogonal in the time domain (i.e., not overlapped).

In one sub embodiment, the starting time of the first time interval in the time domain is the same as that of the second time interval in the time domain.

In one subembodiment, at least one of the energy detections within the first time interval and the energy detection within the second time interval is performed on a frequency-domain resource orthogonal (i.e., not overlapped) to the first sub-band.

In one subembodiment, the third time window and the fourth time window are orthogonal in the time domain.

In one subembodiment, the starting time of the third time window in the time domain is the same as that of the fourth time window in the time domain.

In one subembodiment, the duration of the third time window in the time domain is the same as that of the fourth time window in the time domain.

In one subembodiment, the third time window is before the fourth time window.

In one subembodiment, the UE performs energy detection in M1 given time interval(s) before performing energy detection in the first time interval, and performs M1 first update(s) on the first count; the M1 is 1, or the M1 is 2.

In one subembodiment, the UE performs energy detection in M2 given time interval(s) before performing energy detection in the second time interval, and performs M2 second update(s) on the second count; the M2 is 1, or the M2 is 2.

In one subembodiment, the UE performs energy detection in M1 given time interval(s) before performing energy detection in the first time interval, and determines that the first sub-band is busy in the M1 given time interval(s); the M1 is 1, or the M1 is 2.

In one subembodiment, the UE performs energy detection in M2 given time interval(s) before performing energy detection in the second time interval, and determines that the first sub-band is busy in M2 given time interval(s); the M2 is 1, or the M2 is 2.

In one subembodiment, the duration of the first time interval is one of 25 microseconds, 16 microseconds, or 9 microseconds.

In one subembodiment, the duration of the second time interval is one of 25 microseconds, 16 microseconds, or 9 microseconds.

In one subembodiment, the first time interval is continuous in the time domain.

In one subembodiment, the second time interval is continuous in the time domain.

In one subembodiment, the first sub-band is a Carrier.

In one subembodiment, the first sub-band is a Bandwidth Part (BWP).

In one subembodiment, the first sub-band is composed of a positive integer number of Subcarrier(s) which is (are) continuous in frequency domain.

In one subembodiment, the first sub-band is composed of the frequency-domain resources occupied by a positive integer number of physical resource block(s) (PRB).

In one subembodiment, the first spatial transmit (Tx) parameter group and the second spatial transmit (Tx) parameter group respectively include a beamforming vector.

In one subsidiary embodiment of the subembodiment, the beamforming vector includes an analog beamforming vector.

In one subsidiary embodiment of the subembodiment, the beamforming vector includes a digital beamforming vector.

In one subembodiment, the first time window is before the third time window.

In one subembodiment, the second time window is before the fourth time window.

Embodiment 2

Figure 2:
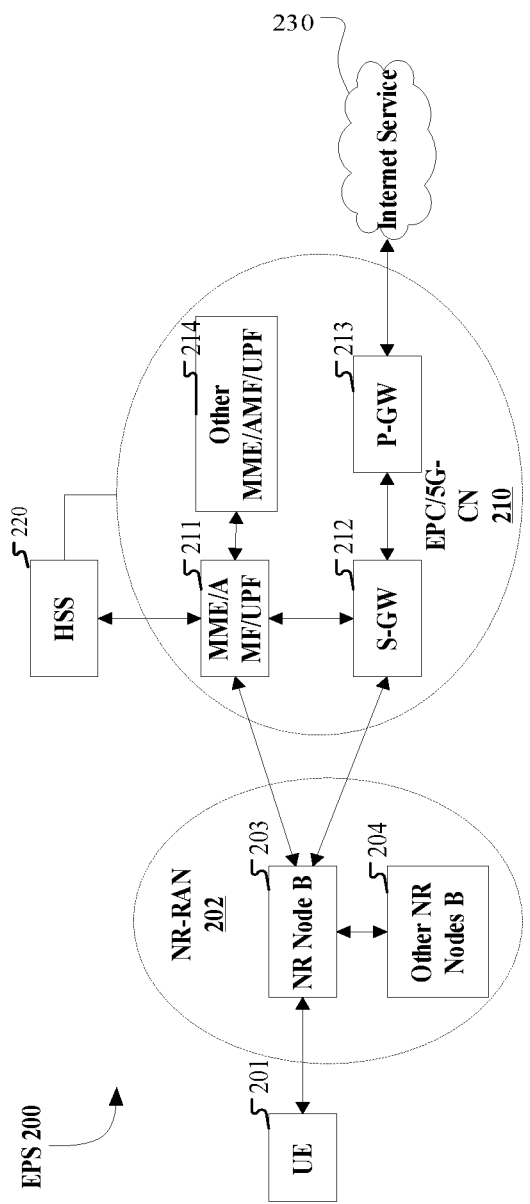
FIG. 2 illustrates a schematic diagram of a network architecture according to one embodiment of the present disclosure.

Embodiment 2 illustrates a schematic diagram of a network architecture, as shown in FIG. 2.

Embodiment 2 illustrates a schematic diagram of a network architecture according to the present disclosure, as shown in FIG. 2. FIG. 2 shows the network architecture 200 of NR 5G, Long-Term Evolution (LTE) and Long-Term Evolution Advanced (LTE-A). NR 5G or LTE network architecture 200 can be referred to as Evolved Packet System (EPS) 200 or some other appropriate term. EPS 200 may include one or more UE 201, Next Generation Radio Access Network (NG-RAN) 202, Evolved Packet Core (EPC)/5G-Core Network (5G-CN) 210, Home Subscriber Server (HSS) 220 and Internet Service 230. EPS can be interconnected with other access networks, but these entities/interfaces are not shown for simplicity. As shown in the figure, EPS provides packet switching services, while those skilled in the art will readily understand that various concepts presented throughout the disclosure can be extended to networks providing circuit switched services or other cellular networks. NG-RAN includes NR node B (gNB)203 and other gNB 204. GNB 203 provides user and control plane protocol termination for UE 201. The gNB 203 may be connected to other gNB 204 via an Xn interface (e.g., return). The gNB 203 may also be referred to as a base station, a base transceiver, a radio base station, a transponder, a transceiver function, a basic service set (BSS), an extended service set (ESS), a transmission and reception point (TRP), or some other suitable terms. GNB 203 provides access point for UE 201 to EEPC/5G-CN 210. Examples of UE 201 include cellular telephone, smart phone, session initiation protocol (SIP) telephone, laptop computer, personal digital assistant (PDA), satellite radio, non-ground base station communication, satellite mobile communication, global positioning system, multimedia device, video device, digital audio player (e.g., MP3 player), camera, game console, unmanned aerial vehicle (UAV), aircraft, narrowband physical network device, machine type communication device, land vehicle, automobile, wearable device, or any other similar functional device. Those skilled in the art may also refer to UE 201 as a mobile station, subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client or some other combination appropriate terminology. GNB 203 is connected to EPC/5G-CN 210 through S1/NG interface. EPC/5G-CN 210 includes MME/AMF/UPF 211, other Mobility Management Entity (MME)/Authentication Management Field (AMF)/User Plane Function (UPF)214, Service Gateway (S-GW) 212 and Packet Date Network Gateway (P-GW) 213. MME/AMF/UPF 211 is a control node that processes signaling between UE 201 and EPC/5G-CN 210. In general, MME/AMF/UPF 211 provides bearing and connection management. All user internet protocol (IP) packets are transmitted through S-GW 212, which itself connects to P-GW 213. P-GW 213 provides UE IP address assignment and other functions. P-GW 213 connects to Internet service 230. Internet service 230 includes internet protocol services corresponding to operators, specifically including Internet, intranet, IP Multimedia Subsystem (IMS) and PS streaming services (PSS).

In one embodiment, the UE 201 corresponds to the UE in the present disclosure.

In one embodiment, the gNB 203 corresponds to the base station in the present disclosure.

In one subembodiment, the UE 201 supports wireless communication for data transmission on unlicensed spectrum.

In one subembodiment, the gNB 203 supports wireless communication for data transmission on unlicensed spectrum.

In one subembodiment, the UE 201 supports massive MIMO wireless communication.

In one subembodiment, the gNB 203 supports massive MIMO wireless communication.

Embodiment 3

Figure 3:
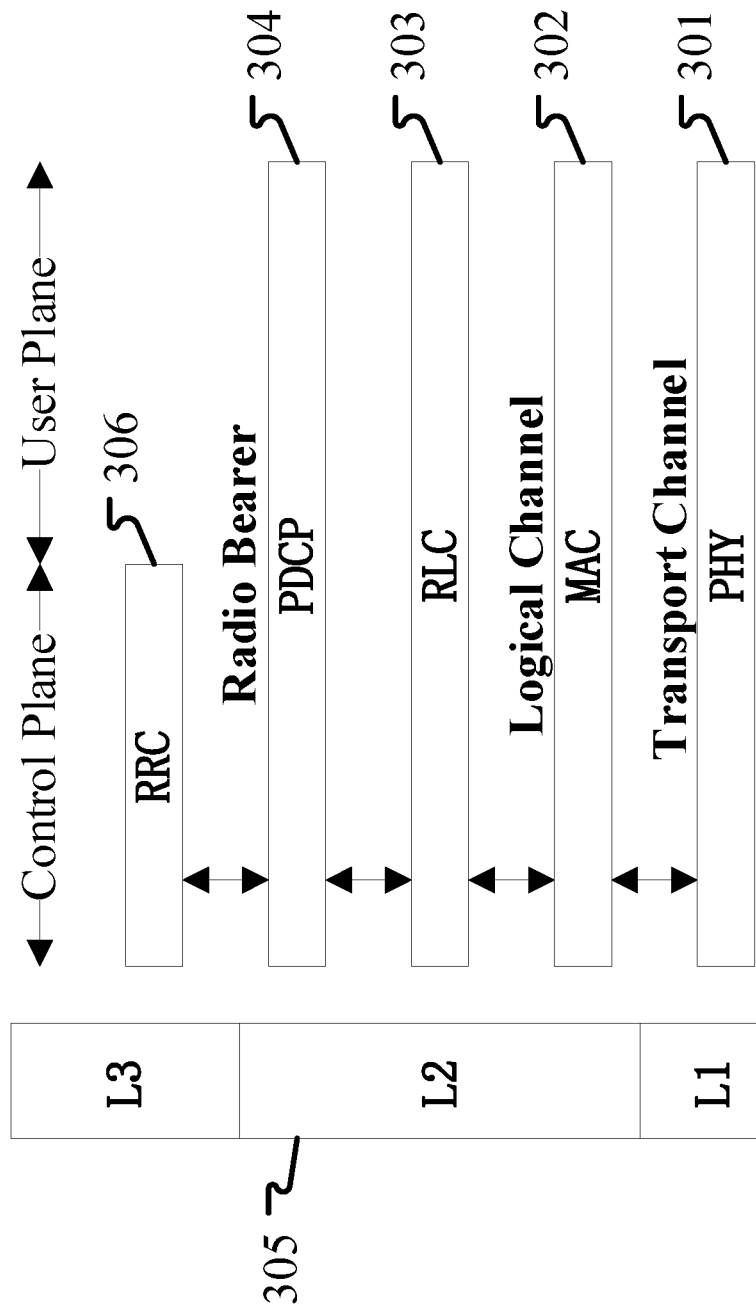
FIG. 3 illustrates a schematic diagram of an example of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3.

FIG. 3 is a schematic diagram illustrating an embodiment of a radio protocol architecture for a user plane and a control plane. FIG. 3 shows a radio protocol architecture for a UE and a base station (gNB or eNB) in three layers: Layer 1, 2 and 3. Layer 1 (L1) is the lowest layer and implements various physical layer (PHY) signal processing functions. L1 will be called PHY 301 in this article. 305, Layer 2 (L2) is above PHY 301 and is responsible for the link between UE and gNB through PHY 301. In the user plane, 305, L2 includes Medium Access Control (MAC) sublayer 302, Radio Link Control (RLC) sublayer 303 and Packet Data Convergence Protocol (PDCP) sublayer 304, which terminate at the gNB on the network side. Although not shown, UE may have several upper layers above 305, L2 including a network layer (e.g., IP layer) terminating at P-GW on the network side and an application layer terminating at the other end of the connection (e.g., remote UE, server, etc.). PDCP sublayer 304 provides multiplexing between different radio carriers and logical channels. PDCP sublayer 304 also provides header compression for upper layer packets to reduce radio transmission overhead, provides security by encrypting packets, and provides region-cross transition support for UE between gNBs. RLC sublayer 303 provides segmentation and reassembling of upper layer data packets, retransmission of lost data packets, and reordering of data packets to compensate for disorder reception caused by HARQ. MAC sublayer 302 provides multiplexing between logic and transport channels. MAC sublayer 302 is also responsible for allocating various radio resources (e.g., resource blocks) in a cell between UEs. MAC sublayer 302 is also responsible for HARQ operations. In the control plane, the radio protocol architecture for UE and gNB is substantially the same for physical layer 301 and 305, L2, but there is no header compression function for the control plane. The control plane also includes the Radio Resource Control (RRC) sublayer 306 in layer 3 (L3). The RRC sublayer 306 is responsible for obtaining radio resources (i.e., radio bearer) and configures the lower layer with RRC signaling between the gNB and UE.

In one subembodiment, the radio protocol architecture in FIG. 3 is applicable to the UE in the present disclosure.

In one subembodiment, the radio protocol architecture in FIG. 3 is applicable to the base station in the present disclosure.

In one subembodiment, the first signaling in the present disclosure is generated by the PHY 301.

In one subembodiment, the first radio signal in the present disclosure is generated by the MAC sublayer 302.

In one subembodiment, the second signaling in the present disclosure is generated by the PHY 301.

Embodiment 4

Figure 4:
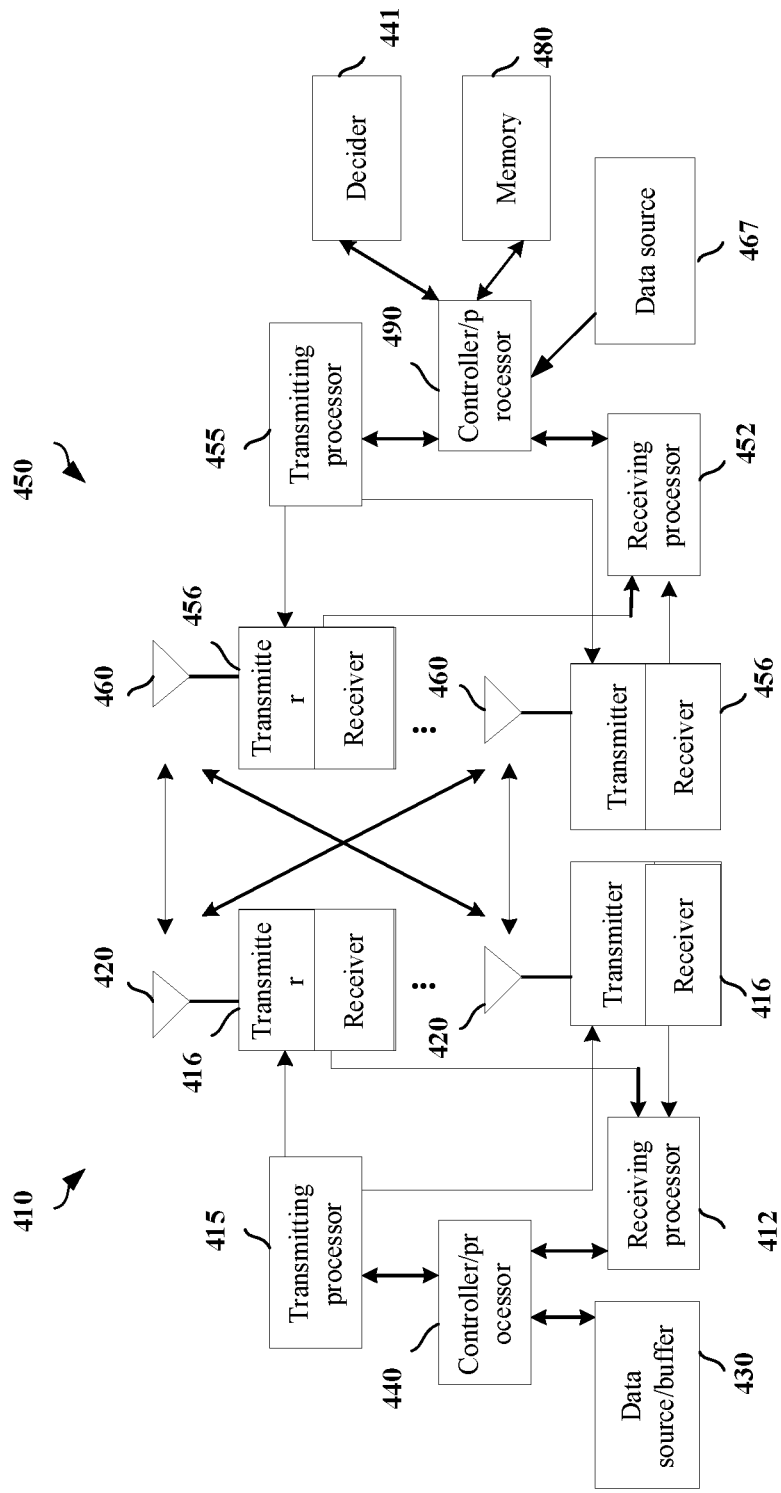
FIG. 4 illustrates a schematic diagram of an evolution node and a UE according to one embodiment of the present disclosure.

Embodiment 4 illustrates a schematic diagram of a base station and a UE according to the present disclosure, as shown in FIG. 4. FIG. 4 is a block diagram of a gNB 410 in communication with a UE 450 in an access network.

The base station (410) comprises a controller/processor 440, a memory 430, a receiving processor 412, a transmitting processor 415, a transmitter/receiver 416 and an antenna 420.

The UE (450) comprises a controller/processor 490, a memory 480, a data source 467, a transmitting processor 455, a receiving processor 452, a decider 441, a transmitter/receiver 456 and an antenna 460.

In uplink (UL) transmission, processes relevant to the base station (410) include the following:

the receiver 416 receives a radio frequency signal via a corresponding antenna 420, converts the received radio frequency signal into a baseband signal, and provides the baseband signal to the receiving processor 412;

the receiver 416/receiving processor 412 monitors a first radio signal in a third time window on a first sub-band, or a first radio signal in a fourth time window on a first sub-band;

the receiving processor 412 performs various signal receiving processing functions for L1 (i.e., PHY), including decoding, deinterleaving, descrambling, demodulation and extraction of physical layer control signaling;

the controller/processor 440 implements L2 layer's function, and is connected to the memory 430 that stores program codes and data;

the controller/processor 440 provides demultiplexing between a transport channel and a logical channel, packet reassembling, decryption, header decompression, and controls signal processing to recover a higher layer packet coming from the UE 450; a higher layer packet from the controller/processor 440 can be provided to the core network;

controller/processor 440 determines the first signaling and the second signaling;

in UL (Uplink), processes relevant to the UE (450) include the following:

the data source 467 provides a higher layer packet to the controller/processor 490. The data source 467 represents all protocol layers above the L2 layer;

the receiver 456/receiving processor 452 performs energy detection in a first time interval to obtain the first detection power, and energy detection in a second time interval to obtain a second detection power; and the result of the energy detection is sent to the controller/processor 490;

the decider 441 performs the following steps: when the first detection power is lower than a first threshold, a first update is performed on a first count; when the second detection power is lower than a second threshold, a second update is performed on a second count; and the result is sent to the controller/processor 490;

the transmitter 456 transmits a radio frequency signal via a corresponding antenna 460, converting the baseband signal into a radio frequency signal, and providing the radio frequency signal to a corresponding antenna 460;

the transmit processor 455 implements various signal receiving processing functions used for L1 (i.e., PHY), including decoding, deinterleaving, descrambling, demodulation and extraction of physical layer control signaling;

transmitter 456/transmitter processor 455, performs the following steps: a value of the first count is equal to Q1, and a first radio signal is transmitted on a first sub-band in a third time window using a first spatial transmit (Tx) parameter group; or, a value of the second count is equal to Q2, and the first radio signal is transmitted on the first sub-band in a fourth time window using the second spatial transmit (Tx) parameter group;

the controller/processor 490 based on radio resource allocation of the gNB 410 performs header compression, encryption, packet segmentation and reordering and multiplexing between a logical channel and a transport channel, so as to implement the L2 function used for user plane and control plane;

the controller/processor 490 is also in charge of HARQ operation, retransmission of a lost packet, and a signaling of the gNB 410;

In one subembodiment, the UE 450 comprises at least one processor and at least one memory. The at least one memory comprises computer program codes; the at least one memory and the computer program codes are configured to be used in collaboration with the at least one processor. The UE 450 at least: performs energy detection in a first time interval to obtain a first detection power is, and performs energy detection in a second time interval to obtain a second detection power; when the first detection power is lower than a first threshold, a first update is performed on a first count; when the second detection power is lower than a second threshold, a second update is performed on a second count; a value of the first count is equal to Q1, and a first radio signal is transmitted on a first sub-band in a third time window using a first spatial transmit (Tx) parameter group; or, a value of the second count is equal to Q2, and the first radio signal is transmitted on the first sub-band in a fourth time window using the second spatial transmit (Tx) parameter group; the Q1 and Q2 are positive integers respectively.

In one subembodiment, the UE 450 comprises a memory that stores a computer readable instruction program. The computer readable instruction program generates an action when executed by at least one processor. The action includes that: a first detection power is obtained by performing energy detection in a first time interval, and a second detection power is obtained by performing energy detection in a second time interval; when the first detection power is lower than a first threshold, a first update is performed on a first count; when the second detection power is lower than a second threshold, a second update is performed on a second count; a value of the first count is equal to Q1, and a first radio signal is transmitted on a first sub-band in a third time window using a first spatial transmit (Tx) parameter group; or, a value of the second count is equal to Q2, and the first radio signal is transmitted on the first sub-band in a fourth time window using the second spatial transmit (Tx) parameter group; the Q1 and Q2 are positive integers respectively.

In one subembodiment, the gNB 410 comprises at least one processor and at least one memory, and the at least one memory comprises computer program codes; the at least one memory and the computer program codes are configured to be used in collaboration with the at least one processor. The gNB 410 at least: monitors a first radio signal in a third time window on a first sub-band and a first radio signal in a fourth time window on a first sub-band; the transmitter of the first radio signal is a first terminal; the first terminal performs energy detection in a first time interval to obtain a first detection power, and the first terminal performs energy detection in a second time interval to obtain a second detection power; when the first detection power is lower than a first threshold, the first terminal performs a first update on a first count; when the second detection power is lower than a second threshold, the first terminal performs a second update on a second count; the first count value is equal to Q1, and the first terminal transmits a first radio signal on a first sub-band in a third time window by using a first spatial transmit (Tx) parameter group; or, a value of the second count is equal to Q2, and the first terminal uses the second spatial transmit (Tx) parameter group to transmit the first radio signal on the first sub-band in a fourth time window; the Q1 and Q2 are positive integers respectively.

In one subembodiment, the gNB 410 comprises a memory that stores a computer readable instruction program. The computer readable instruction program generates an action when executed by at least one processor. The action includes: monitoring a first radio signal in a third time window on a first sub-band and monitoring a first radio signal in a fourth time window on a first sub-band; the transmitter of the first radio signal is a first terminal; the first terminal performs energy detection in a first time interval to obtain a first detection power, and the first terminal performs energy detection in a second time interval to obtain a second detection power; when the first detection power is lower than a first threshold, the first terminal performs a first update on a first count; when the second detection power is lower than a second threshold, the first terminal performs a second update on a second count; the first count value is equal to Q1, and the first terminal transmits a first radio signal on a first sub-band in a third time window by using a first spatial transmit (Tx) parameter group; or, a value of the second count is equal to Q2, and the first terminal uses the second spatial transmit (Tx) parameter group to transmit the first radio signal on the first sub-band in a fourth time window; the Q1 and Q2 are positive integers respectively.

In one subembodiment, the UE 450 corresponds to the UE in the present disclosure.

In one subembodiment, the gNB 410 corresponds to the base station in the present disclosure.

In one subembodiment, at least the first two of receiver 456, receiver processor 452, and controller/processor 490 are used to perform energy detection in a first time interval to obtain a first detection power, and energy detection in a second time interval to obtain a second detection power.

In one subembodiment, the decider 441 is used to perform the following steps: when the first detection power is lower than a first threshold, a first update is performed on a first count; when the second detection power is lower than a second threshold, a second update is performed on a second count.

In one subembodiment, at least the first two of the transmitter 456, the transmitting processor 455 and the controller/processor 490 are used to perform the following steps: a value of the first count is equal to Q1, and a first radio signal is transmitted on a first sub-band in a third time window using a first spatial transmit (Tx) parameter group; or, a value of the second count is equal to Q2, and the first radio signal is transmitted on the first sub-band in a fourth time window using the second spatial transmit (Tx) parameter group.

In one subembodiment, at least the first two of the receiver 456, the receiving processor 452 and the controller/processor 490 are used to receive a first signaling.

In one subembodiment, at least the first two of the receiver 456, the receiving processor 452 and the controller/processor 490 are used to receive first downlink reference signal and second downlink reference signal respectively.

In one subembodiment, at least the first two of the receiver 456, the receiving processor 452 and the controller/processor 490 are used to receive a second signaling.

In one subembodiment, at least the first two of receiver 416, receiver processor 412, and controller/processor 440 are used to monitor a first radio signal in a third time window on a first sub-band, and a first radio signal in a fourth time window on a first sub-band.

In one subembodiment, at least the first two of the transmitter 416, the transmitting processor 415 and the controller/processor 440 are used to transmit a first signaling.

In one subembodiment, at least the first two of the transmitter 416, the transmission processor 415, and the controller/processor 440 are used to transmit a first downlink reference signal and a second downlink reference signal respectively.

In one subembodiment, at least the first two of the transmitter 416, the transmitting processor 415 and the controller/processor 440 are used to transmit a second signaling.

Embodiment 5

Figure 5:
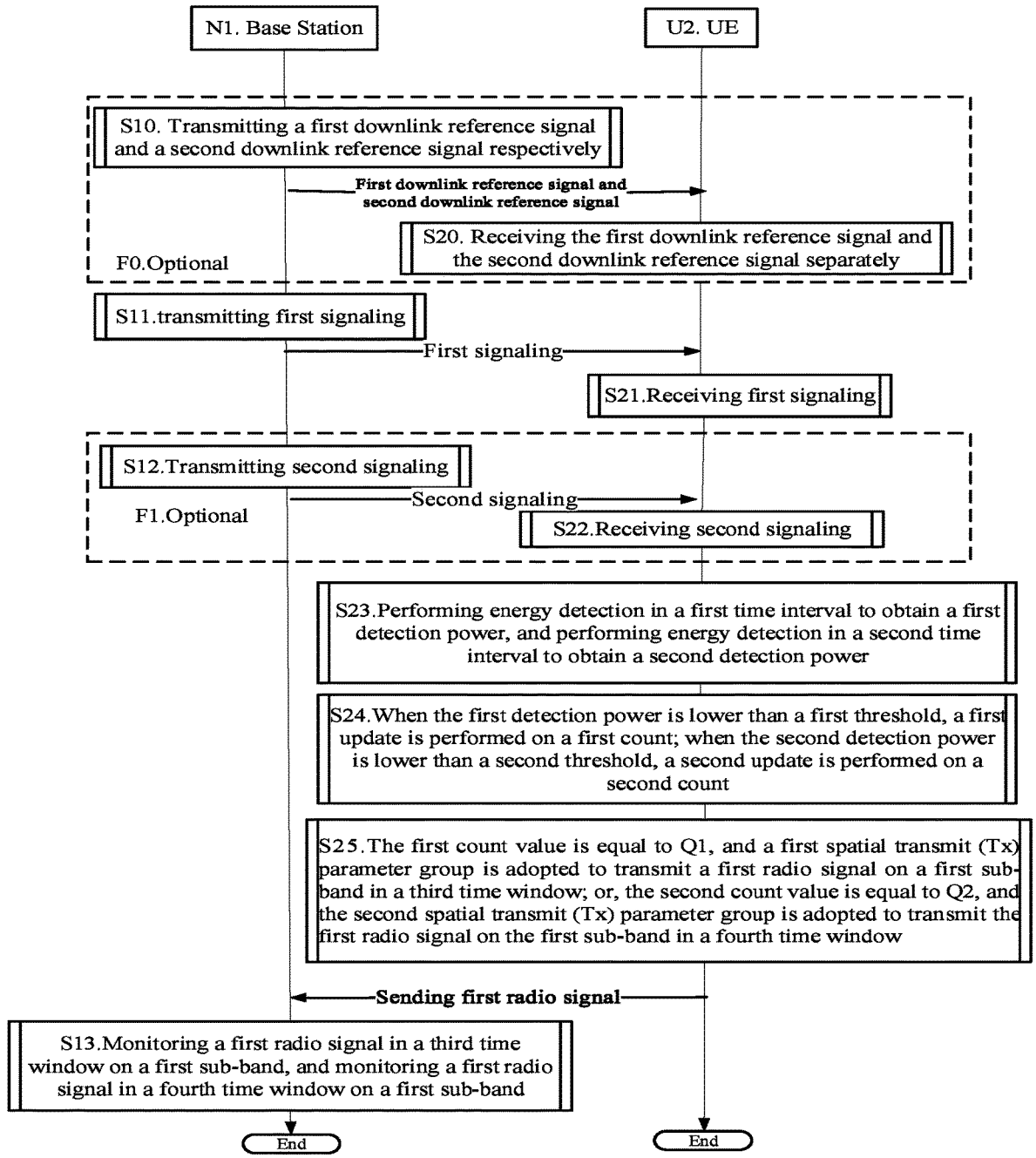
FIG. 5 illustrates a flowchart of a first signaling according to one embodiment of the present disclosure.

Embodiment 5 illustrates a flowchart of a first signaling, as shown in FIG. 5. In FIG. 5, a base station N1 is the maintenance base station of the service cell of a UE U2, and steps marked by block F0 and block F1 are optional.

For base station N1 transmits a first downlink reference signal and a second downlink reference signal respectively in step S10; transmits a first signaling in step S11; transmits a second signaling in step S12; monitors a first radio signal in a third time window on a first sub-band, and a first radio signal in a fourth time window on a first sub-band in step S13;

For UE U2 receives a first downlink reference signal and a second downlink reference signal respectively in step S20; receives a first signaling in step S21; receives a second signaling in step S22; performs energy detection to obtain a first detection power in a first time interval, and energy detection to obtain a second detection power in a second time interval in step S23; in step S24, a first update is performed on a first count when the first detection power is lower than a first threshold; a second update is performed on a second count when the second detection power is lower than a second threshold; in step S25, a value of the first count is equal to Q1, and the first radio signal is transmitted on a first sub-band in a third time window using a first spatial transmit (Tx) parameter group; or, a value of the second count is equal to Q2, and the first radio signal is transmitted on the first sub-band in a fourth time window using the second spatial transmit (Tx) parameter group.

In Embodiment 5, the Q1 and Q2 are positive integers respectively; wherein the first signaling indicates a first antenna port group and a second antenna port group, the first antenna port group and the second antenna port group respectively include a positive integer number of antenna port(s), the first antenna port group and the second antenna port group are respectively associated with the first spatial transmit (Tx) parameter group and the second spatial transmit (Tx) parameter group. Wherein a measurement for the first downlink reference signal and a measurement for the second downlink reference signal are used to generate the first spatial transmit (Tx) parameter group and the second spatial transmit (Tx) parameter group respectively. Wherein the second signaling is used to determine a first modulation coding scheme and a second modulation coding scheme, which respectively correspond to the first spatial transmit (Tx) parameter group and the second spatial transmit (Tx) parameter group.

In one subembodiment, the first signaling is downlink control information (DCI).

In one subembodiment, the first signaling is a higher layer signaling.

In one subembodiment, the first signaling is a physical layer signaling.

In one subembodiment, the first signaling is dynamic.

In one subembodiment, the first signaling indicates a first index and a second index, which respectively identify the first antenna port group and the second antenna port group.

In one subembodiment, the first antenna port group and the second antenna port group are respectively associated with the first spatial transmit (Tx) parameter group and the second spatial transmit (Tx) parameter group, which refers to: the first antenna port group transmits the first radio signal using a first spatial transmit (Tx) parameter group, or the second antenna port group transmits the first radio signal using a second spatial transmit (Tx) parameter group.

In one subembodiment, the first antenna port group and the second antenna port group are respectively associated with the first spatial transmit (Tx) parameter group and the second spatial transmit (Tx) parameter group, which refers to: the first antenna port group is used to transmit a first downlink reference signal, and the reception of the first downlink reference signal is used to determine the first spatial transmit (Tx) parameter group; the first antenna port group is used to transmit a second downlink reference signal, and the reception of the second downlink reference signal is used to determine the second spatial transmit (Tx) parameter group.

In one subembodiment, the first spatial transmit (Tx) parameter group and the second spatial transmit (Tx) parameter group respectively include a third beamforming vector and a fourth beamforming vector.

In one subsidiary embodiment of the subembodiment, the third beamforming vector is related to the first beamforming vector in the disclosure, the fourth beamforming vector is related to the second beamforming vector in the disclosure, and the first beamforming vector and the second beamforming vector are respectively used for the reception of the first downlink reference signal and the second downlink reference signal respectively.

In one subsidiary embodiment of the subembodiment, the third beamforming vector is the first beamforming vector, and the fourth beamforming vector is the second beamforming vector.

In one subembodiment, the Q1 is related to the first antenna port group, and the Q2 is related to the second antenna port.

In one subembodiment, the first threshold and the second threshold are respectively related to the first antenna port group and the second antenna port group.

In one subembodiment, the first downlink reference signal and the second downlink reference signal are respectively transmitted on a first antenna port group and a second antenna port group, the first spatial transmit (Tx) parameter group corresponds to the first antenna port group, the second spatial transmit (Tx) parameter group corresponds to the second antenna port group, and the first antenna port group and the second antenna port group includes a positive integer number of antenna port(s).

In one subembodiment, a beamforming vector adopted by the energy detection performed in the first time interval is spatially related to the first spatial transmit (Tx) parameter group.

In one subsidiary embodiment of the subembodiment, a beamforming vector adopted by the energy detection performed in the first time interval is spatially related to the first spatial transmit (Tx) parameter group, which refers to: the adopted beamforming vector is a first beamforming vector, and the UEU2 receives the first downlink reference signal with the first beamforming vector, which is used to determine the first spatial transmit (Tx) parameter group.

In one subsidiary embodiment of the subembodiment, a beamforming vector adopted by the energy detection performed in the first time interval is spatially related to the first spatial transmit (Tx) parameter group, which refers to: the adopted beamforming vector is a first beamforming vector, and the UEU2 receives the first downlink reference signal and transmit the first radio signal with the first beamforming vector.

In one example of the two subsidiary embodiments, the first beamforming vector includes an analog beamforming vector.

In one example of the two subsidiary embodiments, the first beamforming vector includes a digital beamforming vector.

In one subembodiment, a beamforming vector adopted by the energy detection performed in the second time interval is spatially related to the second spatial transmit (Tx) parameter group.

In one subsidiary embodiment of the subembodiment, a beamforming vector adopted by the energy detection performed in the second time interval is spatially related to the second spatial transmit (Tx) parameter group, which refers to: the adopted beamforming vector is a second beamforming vector, and the UEU2 receives the second downlink reference signal using the second beamforming vector, and the second beamforming vector is used to determine the second spatial transmit (Tx) parameter group.

In one subsidiary embodiment of the subembodiment, a beamforming vector adopted by the energy detection performed in the second time interval is spatially related to the second spatial transmit (Tx) parameter group, which refers to: the adopted beamforming vector is a second beamforming vector, and the UEU2 uses the second beamforming vector to receive the second downlink reference signal and transmit the second radio signal.

In one subembodiment, the second signaling and the first signaling belong to a DCI.

In one subembodiment, the second signaling and the first signaling belong to the same Uplink Grant DCI.

In one subembodiment, the second signaling is a physical layer signaling.

In one subembodiment, the second signaling is dynamic.

In one subembodiment, the second signaling indicates the first modulation coding scheme and the second modulation coding scheme.

In one subembodiment, the second signaling indicates the first modulation coding scheme and a first offset, and the first modulation coding scheme plus the first offset is equal to the second modulation coding scheme.

In one subembodiment, the second signaling indicates the second modulation coding scheme and a second offset, and the second modulation coding scheme plus the second offset is equal to the first modulation coding scheme.

In one subembodiment, the UEU2 transmits the first radio signal using the first spatial transmit (Tx) parameter group, and the first radio signal adopts the first modulation coding scheme.

In one subembodiment, the UEU2 transmits the first radio signal using a second spatial transmit (Tx) parameter group, and the first radio signal adopts the second modulation coding scheme.

In one subembodiment, the first threshold and the second threshold are the same; a measurement for the first antenna port group is used for the energy detection performed within the first time interval, and a measurement for the second antenna port group is used for the energy detection performed within the second time interval.

In one subsidiary embodiment of the subembodiment, the UEU2 obtains the first detection power by performing energy detection with a first beamforming vector in the first time interval, and the second detection power by performing energy detection with a second beamforming vector in the second time interval; the first beamforming vector and the second beamforming vector are respectively related to the first antenna port group and the second antenna port group.

In one example of the subsidiary embodiment, the first beamforming vector and the second beamforming vector are respectively related to the first antenna port group and the second antenna port group, which refers to: the UEU2 uses the first beamforming vector to perform energy detection on the radio signal transmitted on the first antenna port group; the UEU2 uses the second beamforming vector to perform energy detection on the radio signal transmitted on the second antenna port group.

In one example of the subsidiary embodiment, the first beamforming vector is related to the first spatial transmit (Tx) parameter group, and the second beamforming vector is related to the second spatial transmit (Tx) parameter group.

In one subembodiment, the antenna gains corresponding to the first spatial transmit (Tx) parameter group and the second spatial transmit (Tx) parameter group are different.

In one subsidiary embodiment of the subembodiment, the antenna gain corresponding to the first spatial transmit (Tx) parameter group is less than that corresponding to the second spatial transmit (Tx) parameter group.

In one subsidiary embodiment of the subembodiment, the difference between the antenna gain corresponding to the first spatial transmit (Tx) parameter group and the antenna gain corresponding to the second spatial transmit (Tx) parameter group is used to determine the first threshold or the second threshold.

In one subembodiment, the first modulation coding scheme corresponds to one Modulation and Coding Scheme (MCS).

In one subembodiment, the second modulation coding scheme corresponds to one MCS.

Embodiment 6

Figure 6:
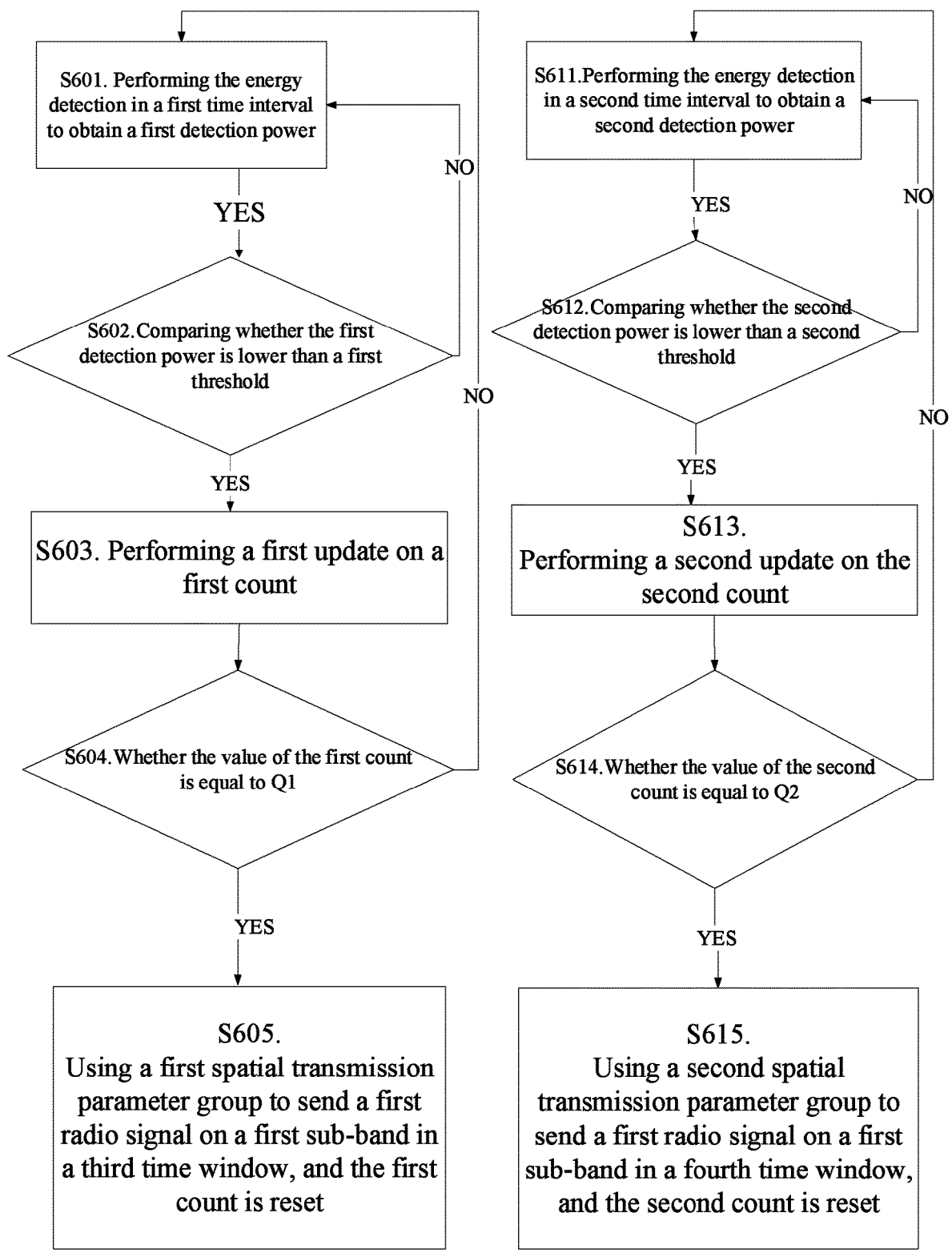
FIG. 6 illustrates a schematic diagram of a first detection power and a first threshold and a second detection power and a second threshold decision according to one embodiment of the present disclosure.

Embodiment 6 illustrates a decision diagram of a first detection power and a first threshold as well as a second detection power and a second threshold, as shown in FIG. 6. In FIG. 6, the UE includes a first LBT processing unit and a second LBT processing unit, and the first LBT processing unit performs the following steps:

step S601, performing energy detection within a first time interval to obtain a first detection power step S602, comparing the size of the first detection power and a first threshold; when the first detection power is lower than the first threshold, enter into step S603; when the first detection power is not lower than the first threshold, return to step S601;

step S603, performing a first update on the first count;

step S604, determining whether a value of the first count is equal to Q1;

step S605, transmitting a first radio signal on a first sub-band in a third time window with a first spatial transmit (Tx) parameter group when a value of the first count is equal to Q1 spatial transmit (Tx) parameter, and the first count is reset; otherwise, return to step S601.

The second LBT processing unit performs the following steps:

step S611, performing energy detection within a second time interval to obtain a second detection power;

step S612, comparing the second detection power with a second threshold, when the second detection power is lower than the second threshold, enter into step S613; when the second detection power is not lower than the second threshold, return to step S611;

step S613, performing a second update on the second count;

step S614, determining whether a value of the second count is equal to Q2;

step S615, transmitting a first radio signal on a first sub-band in a fourth time window with a second spatial transmit (Tx) parameter group when a value of the second count is equal to Q2, spatial transmit (Tx) parameter, and the second count is reset; otherwise, return to step S611.

In one subembodiment, the UE includes two panels, which are respectively used to perform steps for the first LBT processing unit and steps for the second LBT processing unit.

In one subsidiary embodiment of the subembodiment, the steps for the first LBT processing unit and the steps for the second LBT processing unit are executed simultaneously.

In one subembodiment, the UE includes only one panel, and the panel successively performs steps for the first LBT processing unit and steps for the second LBT processing unit in the time domain.

In one subsidiary embodiment of the subembodiment, the steps for the first LBT processing unit are performed prior to the steps for the second LBT processing unit in the time domain.

In one subsidiary embodiment of the subembodiment, the steps for the second LBT processing unit are performed prior to the steps for the first LBT processing unit in the time domain.

In one subsidiary embodiment of the subembodiment, the steps for the first LBT processing unit and the steps for the second LBT processing unit are executed discontinuously in the time domain.

In one subembodiment, the first LBT processing unit includes a controller/processor 490, a transmitting processor 455, a receiving processor 452, a decider 441 and a transmitter/receiver 456 in embodiment 4.

In one subembodiment, the second LBT processing unit includes a controller/processor 490, a transmitting processor 455, a receiving processor 452, a decider 441 and a transmitter/receiver 456 in embodiment 4.

Embodiment 7

Figure 7:
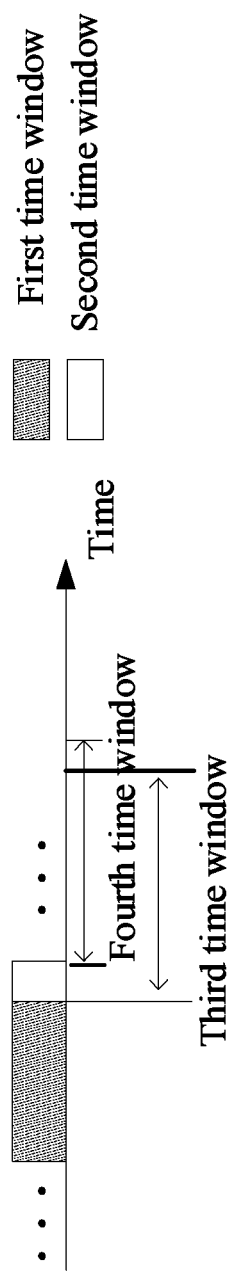
FIG. 7 illustrates a schematic diagram of a first time window and a second time window according to one embodiment of the present disclosure.

Embodiment 7 illustrates a schematic diagram of a first time window and a second time window, as shown in FIG. 7. In FIG. 7, the first time window and the second time window are overlapped in the time domain. The first time window corresponds to the third time window in the disclosure, and the second time window corresponds to the fourth time window in the disclosure; the UE in the disclosure performs energy detection in the first time window to obtain a first detection power in a first time interval, and energy detection in the second time window to obtain a first detection power in a second time interval; the first time window includes a positive integer number of the first time interval(s) in the disclosure, and the second time window includes a positive integer number of the second time interval(s) in the disclosure.

In one subembodiment, a time point when a value of the first count is equal to Q1 is time T1, and when a value of the second count is equal to Q2 is time T2; the T1 is earlier than the T2, and the UE uses the first spatial transmit (Tx) parameter group to transmit the first radio signal on the first sub-band in the third time window; or the T1 is later than the T2, and the UE uses the second spatial transmit (Tx) parameter group to transmit the first radio signal on the first sub-band in the fourth time window; the units of T1 and T2 are milliseconds.

In one subembodiment, the UE includes two panels, which are respectively used to perform energy detection on the first antenna port and the second antenna port in the disclosure.

Embodiment 8

Figure 8:
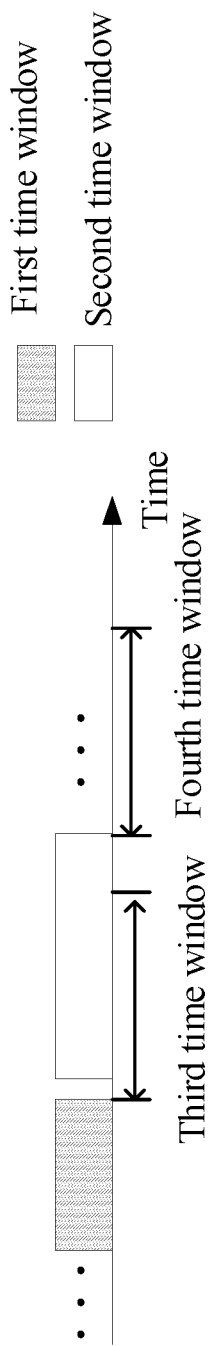
FIG. 8 illustrates a schematic diagram of a first time window and a second time window according to another embodiment of the present disclosure.

Embodiment 8 illustrates a schematic diagram of a first time window and a second time window, as shown in FIG. 8. In FIG. 8, the first time window is located before the second time window in the time domain, the first time window corresponds to the third time window in the disclosure, and the second time window corresponds to the fourth time window in the disclosure; the UE in the disclosure performs energy detection in the first time window to obtain a first detection power in a first time interval, and energy detection in the second time window to obtain a first detection power in a second time interval; the first time window includes a positive integer number of the first time interval(s) in the disclosure, and the second time window includes a positive integer number of the second time interval(s) in the disclosure.

In one subembodiment, the first time window and the second time window are orthogonal in the time domain.

In one subembodiment, the end time of the first time window is before the start time of the second time window.

In one subembodiment, when a value of the first count in the first time window is equal to Q1, the UE transmits the first radio signal on the first sub-band in the third time window using the first spatial transmit (Tx) parameter group.

In one subembodiment, a value of the first count in the first time window is less than Q1, and a value of the second count in the second time window is equal to Q2. The UE uses the second spatial transmit (Tx) parameter group to transmit the first radio signal on the first sub-band in the fourth time window.

In one subembodiment, the UE comprises only one panel, which is used to perform energy detection of Time-domain Multiplexing (TDM) on the first antenna port and the second antenna port in the disclosure.

Embodiment 9

Embodiment 9 illustrates a schematic diagram of a first time window and a second time window, as shown in FIG.

Figure 9:
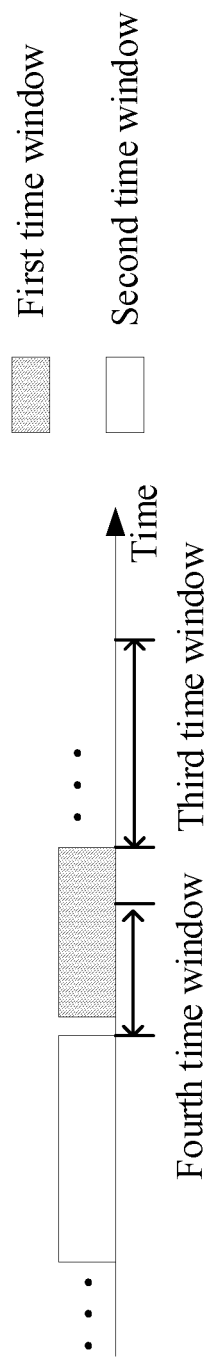
FIG. 9 illustrates a schematic diagram of a first time window and a second time window according to another embodiment of the present disclosure.

9. In FIG. 9, the first time window is located after the second time window in the time domain, the first time window corresponds to the third time window in the disclosure, and the second time window corresponds to the fourth time window in the disclosure; the UE in the disclosure performs energy detection in the first time window to obtain a first detection power in a first time interval, and energy detection in the second time window to obtain a first detection power in a second time interval; the first time window includes a positive integer number of the first time interval(s) in the disclosure, and the second time window includes a positive integer number of the second time interval(s) in the disclosure.

In one subembodiment, the first time window and the second time window are orthogonal in the time domain.

In one subembodiment, the end time of the second time window is before the start time of the first time window.

In one subembodiment, a value of the second count in the second time window is equal to Q2, and the UE uses the second spatial transmit (Tx) parameter group to transmit the first radio signal on the first sub-band in the third time window.

In one subembodiment, a value of the second count in the second time window is less than Q2, and a value of the first count in the first time window is equal to Q1. The UE uses the first spatial transmit (Tx) parameter group to transmit the first radio signal on the first sub-band in the fourth time window.

In one subembodiment, the UE comprises only one panel, which is used to perform energy detection of TDM on the first antenna port and the second antenna port in the disclosure.

Embodiment 10

Figure 10:
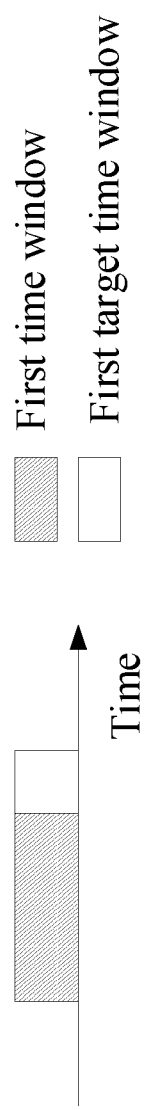
FIG. 10 illustrates a schematic diagram of a first time window and a first target time window according to one embodiment of the present disclosure.

Embodiment 10 illustrates a schematic diagram of a first time window and a first target time window, as shown in FIG. 10. In FIG. 10, the first target time window includes the first time window, the first time window includes a positive integer number of first-type time interval(s), and the first time interval in the disclosure is any one of the positive integer number of first-type time interval(s).

In one subembodiment, a value of the first count in a first time window is less than Q1, and the UE continues to perform energy detection within the time interval after the first time window.

In one subembodiment, the first counter is used for the first count and is not reset when the UE continues to perform energy detection within the time interval after the first time window.

In one subembodiment, the first counter is used for the first count, the first time window belongs to a first target time window, a value of the first count of the UE in the first target time window is less than Q1, the UE drops using the first spatial transmit (Tx) parameter group to transmit the first radio signal. The first counter is reset to 0, or the first counter is reset to (Q1-1).

Embodiment 11

Figure 11:
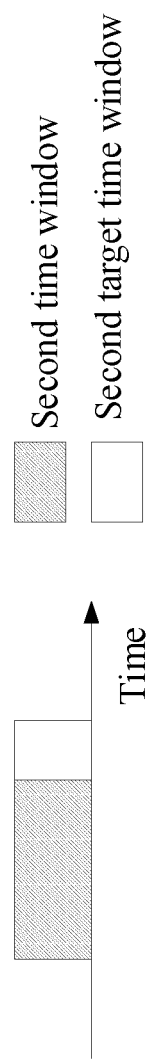
FIG. 11 illustrates a schematic diagram of a second time window and a second target time window according to one embodiment of the present disclosure.

Embodiment 11 illustrates a schematic diagram of a second time window and a second target time window, as shown in FIG. 11. In FIG. 11, the second target time window includes the second time window, the second time window includes a positive integer number of second-type time interval(s), and the second time interval in the disclosure is any one of the positive integer number of second-type time interval(s).

In one subembodiment, a value of the second count in a second time window is less than Q2, and the UE continues to perform energy detection within the time interval after the second time window.

In one subembodiment, the second counter is used for the second count and is not reset when the UE continues to perform energy detection within the time interval after the second time window.

In one subembodiment, the second counter is used for the second count, a value of the second count of the UE in the second target time window is less than Q2, the UE drops transmitting the first radio signal with the second spatial transmit (Tx) parameter group. The second counter is reset to 0, or the second counter is reset to (Q2-1).

Embodiment 12

Figure 12:
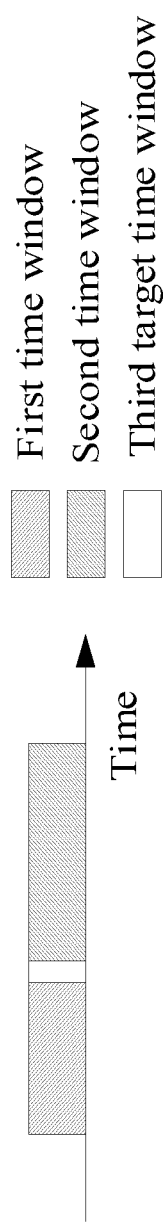
FIG. 12 illustrates a schematic diagram of a first time window, a second time window and a third target time window according to one embodiment of the present disclosure.

Embodiment 12 illustrates a schematic diagram of a first time window, a second time window and a third target time window, as shown in FIG. 12. In FIG. 12, the third target time window includes the first time window and the second time window; the first time window comprises a positive integer number of first-type time interval(s), and the first time interval in the disclosure is any one of the positive integer number of first-type time interval(s); the second time window includes a positive integer number of second-type time interval(s), and the second time interval in the disclosure is any one of the positive integer number of second-type time interval(s).

In one subembodiment, a value of the first count in a third target time window is less than Q1, and a value of the second count in the third target time window is less than Q2; the UE drops transmitting the first radio signal.

In one subembodiment, the duration of the third target time window is fixed, or the duration of the third target time window is configured through high-level signaling.

In one subembodiment, a first counter is used for the first count, the first counter is reset to 0 when the UE drops transmitting the first radio signal, or the first counter is reset to (Q1-1) when the UE drops transmitting the first radio signal.

In one subembodiment, a second counter is used for the second count, and the second counter is reset to 0 when the UE drops transmitting the first radio signal, or the second counter is reset to (Q2-1) when the UE drops transmitting the first radio signal.

Embodiment 13

Figure 13:
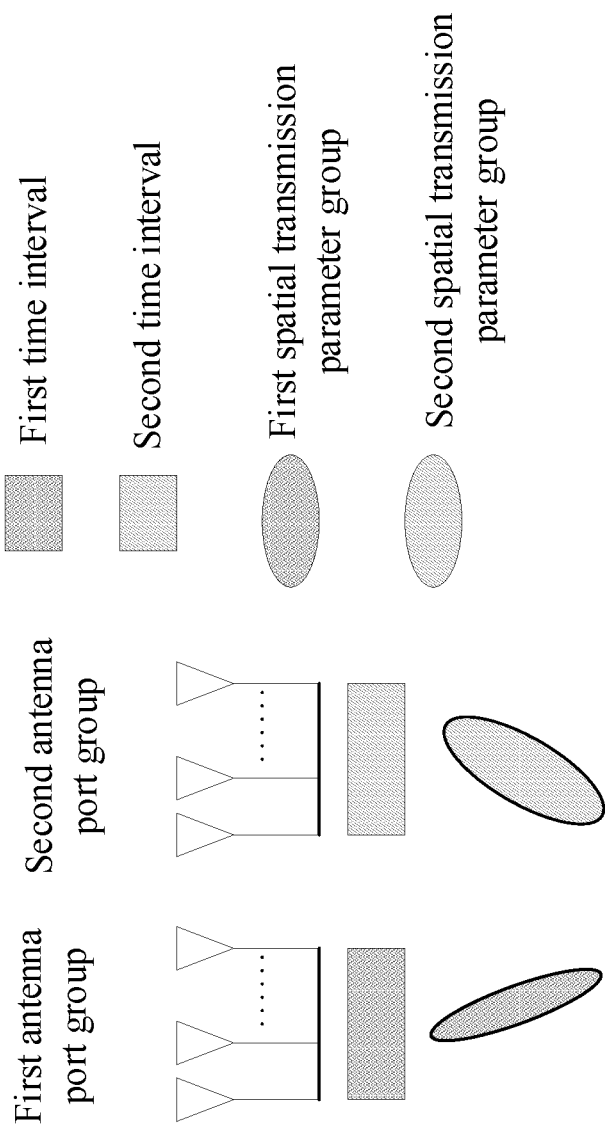
FIG. 13 illustrates a schematic diagram of the first antenna port group and the second antenna port group according to one embodiment of the present disclosure.

Embodiment 13 illustrates a schematic diagram of a first antenna port group and a second antenna port group, as shown in FIG. 13. In FIG. 13, the UE uses a first antenna port group to perform energy detection in a first time interval to obtain a first detection power, and the UE uses a second antenna port group to perform energy detection in a second time interval to obtain a second detection power; the first antenna port group corresponds to a first spatial transmit (Tx) parameter group, and the second antenna port group corresponds to a second spatial transmit (Tx) parameter group.

In one subembodiment, the first spatial parameter transmission group corresponds to the first beamforming vector.

In one subembodiment, the second spatial parameter transmission group corresponds to the second beamforming vector.

In one subembodiment, the first downlink reference signal in the disclosure is transmitted in the first antenna port group, and the second downlink reference signal in the disclosure is transmitted in the second antenna port group; wherein a measurement for the first downlink reference signal and a measurement for the second downlink reference signal are used to generate the first spatial transmit (Tx) parameter group and the second spatial transmit (Tx) parameter group respectively.

Embodiment 14

Figure 14:
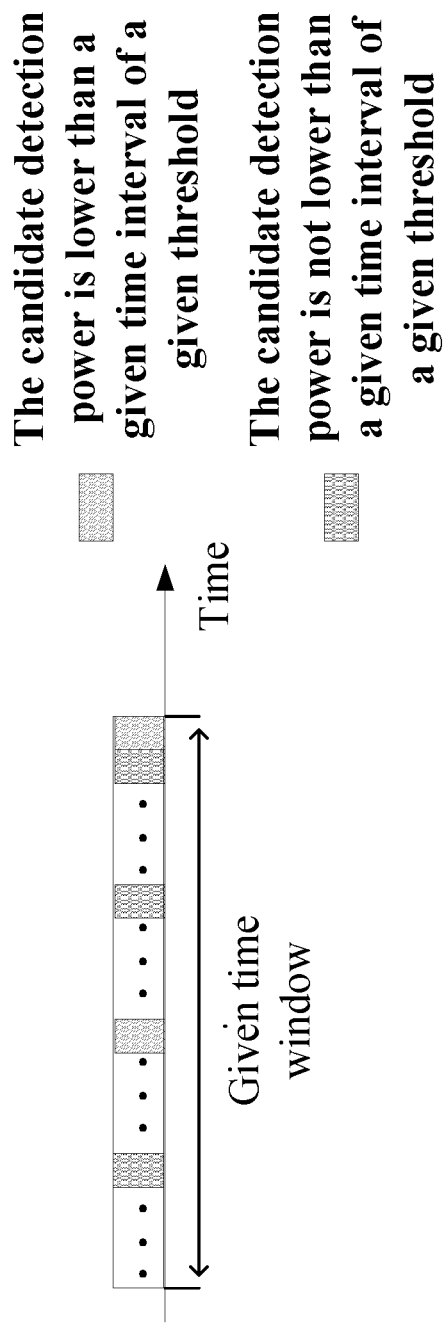
FIG. 14 illustrates a schematic diagram of the relationship between a given time interval and a given time window according to one embodiment of the present disclosure.

Embodiment 14 illustrates a schematic diagram of the relationship between a given time interval and a given time window, as shown in FIG. 14. In FIG. 14, the given time window includes Y given time interval(s), and the UE in the disclosure performs energy detection within the Y given time interval(s) to obtain Y candidate detection power(s); among the Y candidate detection power(s), Y1 candidate detection power(s) is(are) lower than a given threshold, and the remaining (Y−Y1) detection power(s) is(are) not lower than a given threshold; Y is a positive integer, and Y1 is a positive integer not bigger than Y.

In one subembodiment, the duration of the Y given time interval(s) is(are) the same in the time domain.

In one subembodiment, the given time interval corresponds to the first time interval in the disclosure, the given time window corresponds to the first time window in the disclosure, the Y1 corresponds to the Q1 in the disclosure, the given threshold corresponds to the first threshold in the disclosure, and the candidate detection power corresponds to the first detection power in the disclosure.

In one subembodiment, the given time interval corresponds to the second time interval in the disclosure, the given time window corresponds to the second time window in the disclosure, the Y1 corresponds to Q2 in the disclosure, the given threshold corresponds to the second threshold in the disclosure, and the candidate detection power corresponds to the second detection power in the disclosure.

Embodiment 15

Figure 15:
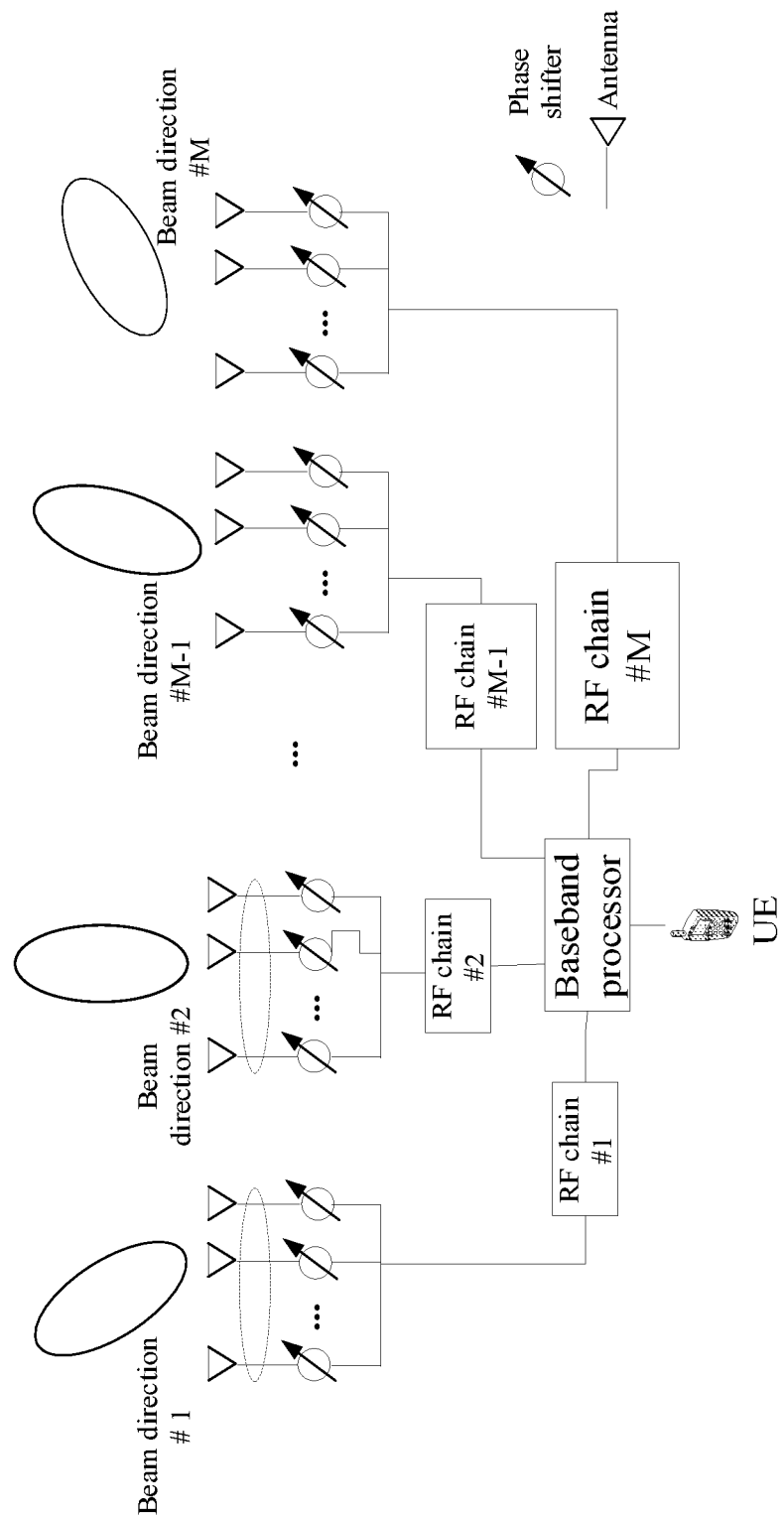
FIG. 15 illustrates a schematic diagram of antenna structures of UE according to one embodiment of the present disclosure respectively.

Embodiment 15 illustrates a schematic diagram of an antenna structure equipped with a UE, as shown in FIG. 15. In FIG. 15, the UE is equipped with M RF chains, i.e. RF chain 1, RF chain 2, . . . , RF chain M. The M RF chains are connected into a baseband processor.

In one subembodiment, the bandwidth supported by any one of the M RF chains does not exceed the bandwidth of the sub-band configured by the UE.

In one subembodiment, M1 RF chains in the M RF chains are superposed to generate an antenna port through antenna virtualization, and the M1 RF chains are respectively connected to M1 antenna groups, and each antenna group in the M1 antenna groups includes a positive integer and an antenna. An antenna group is connected to the baseband processor through an RF chain, and different antenna groups correspond to different RF chains. A mapping coefficient of an antenna to the antenna port included in any antenna within the M1 antenna group constitutes the analog beamforming vectors of the antenna group. The corresponding analog beamforming vectors of the M1 antenna groups are diagonally arranged to form the analog beamforming matrix of the antenna port. The mapping coefficients from the M1 antenna groups to the antenna ports constitute the digital beamforming vectors of the antenna ports.

In one subembodiment, the M1 RF chains belong to the same panel.

In one subembodiment, the M1 RF chains are QCL.

In one subembodiment, the M2 RF chains in the M RF chains generate a receiving beam through the superposition of antenna virtualization, and the M2 RF chains are respectively connected with M2 antenna groups, each of which includes a positive integer and an antenna. An antenna group is connected to the baseband processor through an RF chain, and different antenna groups correspond to different RF chains. A mapping coefficient of an antenna to the receiving beam included in any antenna group in the M2 antenna groups forms an analog beamforming vector of the receiving beam. The corresponding analog beamforming vectors of the M2 antenna groups are diagonally arranged to form the analog beamforming matrix of the receiving beam. The mapping coefficients from the M2 antenna groups to the receiving beams form the digital beamforming vector of the receiving beams.

In one subembodiment, the M1 RF chains belong to the same panel.

In one subembodiment, the M2 RF chains are QCL.

In one subembodiment, the directions of the analog beams formed by the M RF chains are respectively shown in beam direction #1, beam direction #2, beam direction #M−1, and beam direction #M in FIG. 9.

In one subembodiment, layer to antenna ports are mapped one by one.

In one subembodiment, one layer is mapped to multiple antenna ports.

In one subembodiment, the M is an even number, and RF chain #1, RF chain #2, . . . , RF chain #M/2 of the M RF chains are connected to a first panel, and RF chain #M/2+1, RF chain #M/2+2, . . . , and RF chain #M of the M RF chains are connected to a second panel.

In one subembodiment, the first panel and the second panel respectively adopt different crystal oscillators.

In one subembodiment, the M RF chains correspond to a panel.

Embodiment 16

Figure 16:
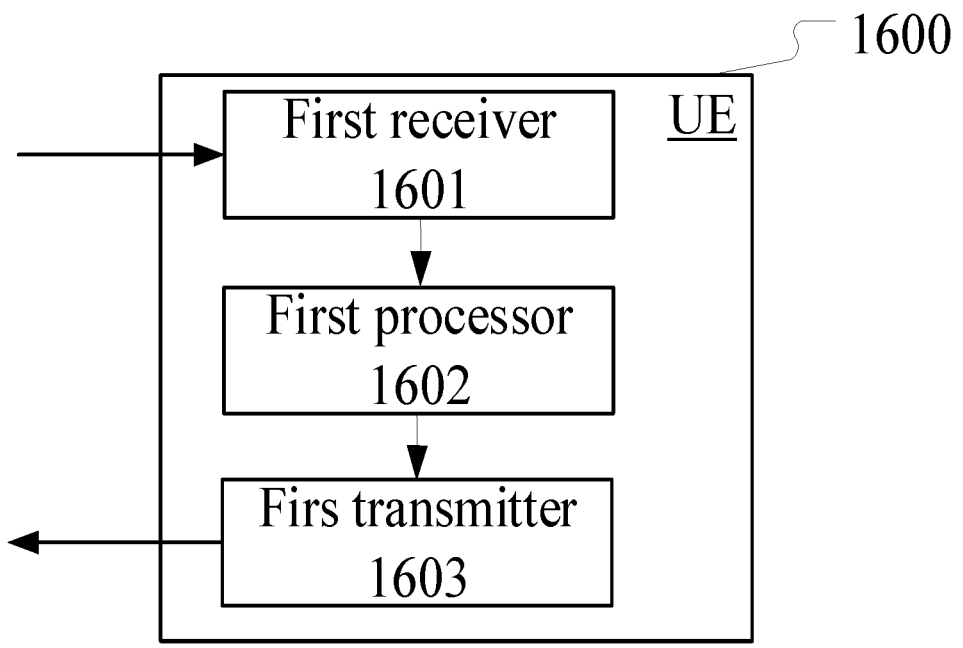
FIG. 16 illustrates a structure block diagram of a processing device of a UE according to one embodiment of the present disclosure.

Embodiment 16 illustrates the structure diagram of a processing device in a UE, as shown in FIG. 16. In FIG. 16, UE processing device 1600 is mainly composed of a first receiver 1601, a first processor 1602 and a first transmitter 1603.

A first receiver 1601 performs energy detection in a first time interval to obtain a first detection power, and energy detection in a second time interval to obtain a second detection power;

A first processor 1602 performs a first update on a first count when the first detection power is lower than a first threshold; when the second detection power is lower than a second threshold, a second update is performed on a second count;

A first transmitter 1603 uses a spatial transmit (Tx) parameter group to transmit a first radio signal on a first sub-band in a third time window when a value of the first count is equal to Q1; or, a value of the second count is equal to Q2, and the first radio signal is transmitted on the first sub-band in a fourth time window using the second spatial transmit (Tx) parameter group.

In Embodiment 16, the Q1 and Q2 are positive integers respectively.

In one subembodiment, the first receiver 1601 also receives first signaling; wherein the first signaling indicates a first antenna port group and a second antenna port group, the first antenna port group and the second antenna port group respectively include a positive integer number of antenna port(s), the first antenna port group and the second antenna port group are respectively associated with the first spatial transmit (Tx) parameter group and the second spatial transmit (Tx) parameter group.

In one subembodiment, the first receiver 1601 also receives a first downlink reference signal and a second downlink reference signal respectively; wherein a measurement for the first downlink reference signal and a measurement for the second downlink reference signal are used to generate the first spatial transmit (Tx) parameter group and the second spatial transmit (Tx) parameter group respectively.

In one subembodiment, the first receiver 1601 also receives second signaling; wherein the second signaling is used to determine a first modulation coding scheme and a second modulation coding scheme, which respectively correspond to the first spatial transmit (Tx) parameter group and the second spatial transmit (Tx) parameter group.

In one subembodiment, the first threshold and the second threshold are the same; a measurement for the first antenna port group is used for the energy detection performed within the first time interval, and a measurement for the second antenna port group is used for the energy detection performed within the second time interval.

In one subembodiment, the antenna gain corresponding to the first spatial transmit (Tx) parameter group and the antenna gain corresponding to the second spatial transmit (Tx) parameter group are different.

In one subembodiment, the first receiver 1601 comprises at least the first two of the receiver 456, the receiving processor 452 or the controller/processor 490 in Embodiment 4.

In one subembodiment, the first processor 1602 includes a decider 441 in embodiment 4.

In one subembodiment, the first transmitter 1603 comprises at least the first two of the transmitter 456, the transmitting processor 455 or the controller/processor 490 in Embodiment 4.

Embodiment 17

Figure 17:
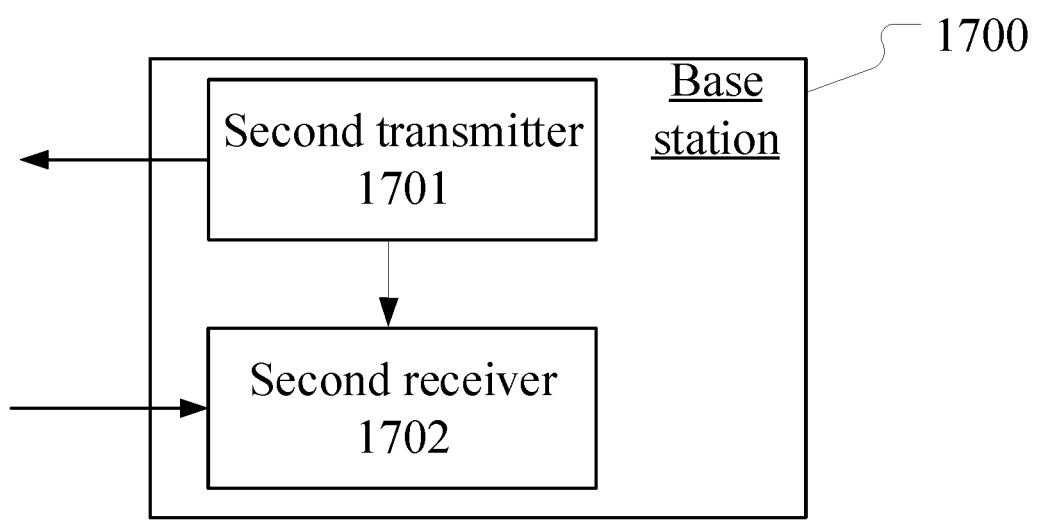
FIG. 17 illustrates a structure block diagram of a processing device of a base station according to one embodiment of the present disclosure.

Embodiment 17 illustrates a structure block diagram of a processing device in a base station, as shown in FIG. 17. In FIG. 17, the base station processing device 1700 is mainly composed of a second receiver 1701 and a second transmitter 1702.

A second receiver 1701 monitors a first radio signal in a third time window on a first sub-band and a first radio signal in a fourth time window on a first sub-band;

A second transmitter 1702 transmits a first signaling;

In Embodiment 17, the transmitter of the first radio signal is a first terminal; the first terminal performs energy detection in a first time interval to obtain a first detection power, and the first terminal performs energy detection in a second time interval to obtain a second detection power; when the first detection power is lower than a first threshold, the first terminal performs a first update on a first count; when the second detection power is lower than a second threshold, the first terminal performs a second update on a second count; the first count value is equal to Q1, and the first terminal transmits a first radio signal on a first sub-band in a third time window by using a first spatial transmit (Tx) parameter group; or, a value of the second count is equal to Q2, and the first terminal uses the second spatial transmit (Tx) parameter group to transmit the first radio signal on the first sub-band in a fourth time window; the Q1 and Q2 are positive integers respectively. Wherein the first signaling indicates a first antenna port group and a second antenna port group, the first antenna port group and the second antenna port group respectively include a positive integer number of antenna port(s), the first antenna port group and the second antenna port group are respectively associated with the first spatial transmit (Tx) parameter group and the second spatial transmit (Tx) parameter group.

In one subembodiment, the second transmitter 1702 transmits a first downlink reference signal and a second downlink reference signal respectively; wherein a measurement for the first downlink reference signal and a measurement for the second downlink reference signal are used to generate the first spatial transmit (Tx) parameter group and the second spatial transmit (Tx) parameter group respectively.

In one subembodiment, the second transmitter 1702 also transmits second signaling; wherein the second signaling is used to determine a first modulation coding scheme and a second modulation coding scheme, which respectively correspond to the first spatial transmit (Tx) parameter group and the second spatial transmit (Tx) parameter group.

In one subembodiment, the first threshold and the second threshold are the same; a measurement for the first antenna port group is used for the energy detection performed within the first time interval, and a measurement for the second antenna port group is used for the energy detection performed within the second time interval.

In one subembodiment, the antenna gains corresponding to the first spatial transmit (Tx) parameter group and the second spatial transmit (Tx) parameter group are different.

In one subembodiment, the second receiver 1702 comprises at least the first two of the receiver 416, the receiving processor 412 or the controller/processor 440 in Embodiment 4.

In one subembodiment, the second transmitter 1701 comprises at least the first two of the transmitter 416, the transmitting processor 415 or the controller/processor 440 in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, tele-controlled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for wireless communication, comprising:
   receiving a first signaling;
   performing energy detection in a first time interval to obtain a first detection power;
   performing energy detection in a second time interval to obtain a second detection power;
   when the first detection power is lower than a first threshold, updating a first count;
   when the second detection power is lower than a second threshold, updating a second count;
   when the first count is equal to Q1, transmitting a first radio signal on a first sub-band in a third time window using a first spatial transmit parameter group;
   when the second count is equal to Q2, transmitting the first radio signal on the first sub-band in a fourth time window using a second spatial transmit parameter group;
   wherein:
   the Q1 and Q2 are positive integers respectively;
   the first signaling indicates a first antenna port group and a second antenna port group;
   the first antenna port group and the second antenna port group respectively comprise a positive integer number of antenna port/ports;
   the first antenna port group and the second antenna port group are respectively associated with the first spatial transmit parameter group and the second spatial transmit parameter group;
   a measurement for the first antenna port group is used for performing energy detection in the first time interval;
   a measurement for the second antenna port group is used for performing energy detection in the second time interval; and
   the energy detections performed in the first time interval and the second time interval are performed in the first sub-band.

2. The method in the UE according to claim 1, further comprising:
   receiving a first downlink reference signal and a second downlink reference signal respectively; and
   wherein a measurement for the first downlink reference signal and a measurement for the second downlink reference signal are used to generate the first spatial transmit parameter group and the second spatial transmit parameter group respectively.

3. The method in the UE according to claim 1, further comprising:
   receiving a second signaling; and
   wherein the second signaling is used to determine a first modulation coding scheme and a second modulation coding scheme, respectively corresponding to the first spatial transmit parameter group and the second spatial transmit parameter group.

4. The method in the UE according to claim 1, wherein:
   the first threshold is the same with the second threshold; or
   antenna gains corresponding to the first spatial transmit parameter group and the second spatial transmit parameter group are different.

5. The method in the UE according to claim 1, wherein:
   updating of the first count comprises decrementing the first count by 1 or resetting the first count to (Q1-1);
   updating of the second count comprises decrementing the second count by 1 or resetting the second count to (Q2-1);
   the first detection power corresponds to a first beamforming vector;
   the second detection power is for a second beamforming vector; and
   the method in the UE further comprising detecting whether a channel is idle on the first and/or second beamforming vectors respectively according to the first threshold and Q1 corresponding to the first beamforming vector, and the second threshold and Q2 corresponding to the second beamforming vector.

6. A method in a base station for wireless communication, comprising:
   transmitting a first signaling;
   monitoring a first radio signal in a third time window on a first sub-band and monitoring the first radio signal in a fourth time window on the first sub-band;
   wherein:
   a transmitter of the first radio signal is a first terminal;
   the first terminal performs energy detection in a first time interval to obtain a first detection power, and the first terminal performs energy detection in a second time interval to obtain a second detection power;
   when the first detection power is lower than a first threshold, the first terminal updates a first count;
   when the second detection power is lower than a second threshold, the first terminal updates a second count;
   when the first count is equal to Q1, the first terminal transmits the first radio signal on the first sub-band in the third time window by using a first spatial transmit parameter group;
   when the second count is equal to Q2, the first terminal uses a second spatial transmit parameter group to transmit the first radio signal on the first sub-band in the fourth time window;
   the Q1 and Q2 are positive integers respectively;
   the first signaling indicates a first antenna port group and a second antenna port group;
   the first antenna port group and the second antenna port group respectively include a positive integer number of antenna port/ports;
   the first antenna port group and the second antenna port group are respectively associated with the first spatial transmit parameter group and the second spatial transmit parameter group;
   a measurement for the first antenna port group is used for the energy detection performed within the first time interval;
   a measurement for the second antenna port group is used for the energy detection performed within the second time interval; and
   the energy detection in the first time interval and the energy detection in the second time interval are performed in the first sub-band.

7. The method in the base station according to claim 6, further comprising:
   transmitting a first downlink reference signal and a second downlink reference signal respectively;

wherein a measurement for the first downlink reference signal and a measurement for the second downlink reference signal are used to generate the first spatial transmit parameter group and the second spatial transmit parameter group respectively.

8. The method in the base station according to claim 6, further comprising:
transmitting a second signaling;
wherein the second signaling is used to determine a first modulation coding scheme and a second modulation coding scheme respectively corresponding to the first spatial transmit parameter group and the second spatial transmit parameter group.

9. The method in the base station according to claim 6, wherein:
the first threshold is the same with the second threshold; or
antenna gains corresponding to the first spatial transmit parameter group and the second spatial transmit parameter group are different.

10. The method in the base station according to claim 6, wherein:
when the first terminal updates the first count, the first count is decremented by 1 or reset to (Q1-1);
when first terminal updates the second count, the second count is decremented by 1 or reset to (Q2-1);
the first detection power corresponds to a first beamforming vector;
the second detection power is for a second beamforming vector; and
the first terminal detects whether a channel is idle on the first and/or second beamforming vectors respectively according to the first threshold and Q1 corresponding to the first beamforming vector, and the second threshold and Q2 corresponding to the second beamforming vector.

11. A UE for wireless communication, comprising:
a first receiver, receiving the first signaling, performing energy detection in a first time interval to obtain a first detection power, and performing energy detection in a second time interval to obtain a second detection power;
a first processor, updating a first count when the first detection power is lower than a first threshold; and updating a second count when the second detection power is lower than a second threshold; and
a first transmitter, transmitting a first radio signal on the first sub-band in a third time window using a first spatial transmit parameter group when the first count is equal to Q1; or, transmitting the first radio signal on the first sub-band in a fourth time window using a second spatial transmit parameter group when the second count is equal to Q2; wherein:
the Q1 and Q2 are positive integers respectively;
the first signaling indicates a first antenna port group and a second antenna port group;
the first antenna port group and the second antenna port group respectively include a positive integer number of antenna port/ports;
the first antenna port group and the second antenna port group are respectively associated with the first spatial transmit parameter group and the second spatial transmit parameter group;
a measurement for the first antenna port group is used for the energy detection performed within the first time interval;
a measurement for the second antenna port group is used for the energy detection performed within the second time interval; and
the energy detection in the first time interval and the energy detection in the second time interval are performed in the first sub-band.

12. The UE according to claim 11, wherein the first receiver receives a first downlink reference signal and a second downlink reference signal respectively; wherein a measurement for the first downlink reference signal and a measurement for the second downlink reference signal are used to generate the first spatial transmit parameter group and the second spatial transmit parameter group respectively.

13. The UE according to claim 11, wherein the first receiver receives a second signaling; wherein the second signaling is used to determine a first modulation coding scheme and a second modulation coding scheme respectively correspond to the first spatial transmit parameter group and the second spatial transmit parameter group.

14. The UE according to claim 1, wherein:
the first threshold is the same with the second threshold; or
antenna gains corresponding to the first spatial transmit parameter group and the second spatial transmit parameter group are different.

15. The UE according to claim 11, wherein:
when the first processor updates the first count, the first count is decremented by 1 or reset to (Q1-1);
when the first processor updates the second count, the second count is decremented by 1 or reset to (Q2-1);
the first detection power corresponds to a first beamforming vector;
the second detection power is for a second beamforming vector; and
the UE detects whether a channel is idle on the first and/or second beamforming vectors respectively according to the first threshold and Q1 corresponding to the first beamforming vector, and the second threshold and Q2 corresponding to the second beamforming vector.

16. A base station for wireless communication, comprising:
a second transmitter, transmitting a first signaling;
a second receiver, monitoring a first radio signal in a third time window on a first sub-band and monitoring the first radio signal in a fourth time window on the first sub-band; wherein:
a transmitter of the first radio signal is a first terminal;
the first terminal performs energy detection in a first time interval to obtain a first detection power;
the first terminal performs energy detection in a second time interval to obtain a second detection power;
when the first detection power is lower than a first threshold, the first terminal updates a first count;
when the second detection power is lower than a second threshold, the first terminal updates a second count;
when the first count is equal to Q1, the first terminal transmits the first radio signal on the first sub-band in a third time window by using a first spatial transmit parameter group;
when the second count is equal to Q2, the first terminal uses a second spatial transmit parameter group to transmit the first radio signal on the first sub-band in a fourth time window;
the Q1 and Q2 are positive integers respectively;
the first signaling indicates a first antenna port group and a second antenna port group;

the first antenna port group and the second antenna port group respectively include a positive integer number of antenna port/ports;

the first antenna port group and the second antenna port group are respectively associated with the first spatial transmit parameter group and the second spatial transmit parameter group;

a measurement for the first antenna port group is used for the energy detection performed within the first time interval;

a measurement for the second antenna port group is used for the energy detection performed within the second time interval; and the energy detection in the first time interval and the energy detection in the second time interval are performed in the first sub-band.

17. The base station according to claim 16, wherein the second transmitter, transmits a first downlink reference signal and a second downlink reference signal respectively; and a measurement for the first downlink reference signal and a measurement for the second downlink reference signal are used to generate the first spatial transmit parameter group and the second spatial transmit parameter group respectively.

18. The base station according to claim 16, comprising: wherein:

the second transmitter, transmitting transmits a second signaling; and the second signaling is used to determine a first modulation coding scheme and a second modulation coding scheme respectively correspond to the first spatial transmit parameter group and the second spatial transmit parameter group.

19. The base station according to claim 16, wherein:

the first threshold is the same with the second threshold; or antenna gains corresponding to the first spatial transmit parameter group and the second spatial transmit parameter group are different.

20. The base station according to claim 16, wherein:

when the first terminal updates the first count, the first count is decremented by 1 or reset to (Q1-1);

when first terminal updates the second count, the second count is decremented by 1 or reset to (Q2-1);

the first detection power corresponds to a first beamforming vector;

the second detection power is for a second beamforming vector; and the first terminal detects whether a channel is idle on the first and/or second beamforming vectors respectively according to the first threshold and Q1 corresponding to the first beamforming vector, and the second threshold and Q2 corresponding to the second beamforming vector.

* * * * *